(12) United States Patent  (10) Patent No.: US 6,988,167 B2
Allen et al.  (45) Date of Patent: Jan. 17, 2006

(54) CACHE SYSTEM WITH DMA CAPABILITIES AND METHOD FOR OPERATING SAME

(75) Inventors: Michael S. Allen, Austin, TX (US); Moinul I. Syed, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 609 days.

(21) Appl. No.: 09/779,209

(22) Filed: Feb. 8, 2001

(65) Prior Publication Data

US 2002/0108019 A1 Aug. 8, 2002

(51) Int. Cl.
*G06F 12/00* (2006.01)

(52) U.S. Cl. .......................... 711/128; 710/26; 710/27; 710/28

(58) Field of Classification Search ................ 711/118, 711/128–132; 710/22–28
See application file for complete search history.

(56) References Cited

U.S. PATENT DOCUMENTS

| | | | | |
|---|---|---|---|---|
| 4,456,952 A | * | 6/1984 | Mohrman et al. | 714/11 |
| 5,485,592 A | * | 1/1996 | Lau | 711/143 |
| 5,553,263 A | * | 9/1996 | Kalish et al. | 711/127 |
| 5,561,781 A | * | 10/1996 | Braceras et al. | 711/130 |
| 5,574,662 A | * | 11/1996 | Windrem et al. | 709/219 |
| 5,590,308 A | * | 12/1996 | Shih | 711/130 |
| 5,675,765 A | | 10/1997 | Malamy et al. | |
| 5,893,146 A | | 4/1999 | Pickett | |
| 5,900,012 A | | 5/1999 | Tran | |
| 6,047,358 A | | 4/2000 | Jacobs | |

(Continued)

FOREIGN PATENT DOCUMENTS

| | | |
|---|---|---|
| EP | 000507066 A1 | * 10/1992 |
| EP | 000637799 A2 | * 2/1995 |

OTHER PUBLICATIONS

IBM Technical Disclosure Bulletin, Apr. 1983, vol. 25, Issue 11B, pp. 5960-5961. Shared Cache in a Checkpoint Environment.*

*Primary Examiner*—Kim Huynh
*Assistant Examiner*—Alan S. Chen
(74) *Attorney, Agent, or Firm*—Wolf, Greenfield & Sacks, P.C.

(57) ABSTRACT

In parallel with accesses to a cache made by a core processor, a DMA controller is used to pre-load data from a main memory into the cache. In this manner, the pre-load function can make the data available to the processor application before the application references the data, thereby potentially providing a 100% cache hit ratio since the correct data is pre-loaded into the cache. In addition, if a copy-back cache is employed, the cache memory system can also be configured such that processed data can be dynamically unloaded from the cache to the main memory in parallel with accesses to the cache made by the core processor. The pre-loading and/or post unloading of data may be accomplished, for example, by using a DMA controller to burst data into and out of the cache in parallel with accesses to the cache by the core processor. This DMA control function may be integrated into the existing cache control logic so as to reduce the complexity of the cache hardware (e.g., as compared to a multi-port cache), and to alleviate the difficulty associated with addressing the non-contiguous internal address map of the cache. By employing a DMA controller having flexible address generation and transfer control capabilities, data can be transferred from an atypical memory-mapped entity (e.g., a FIFO buffer of a peripheral) directly to the cache.

22 Claims, 14 Drawing Sheets

U.S. PATENT DOCUMENTS

| | | |
|---|---|---|
| 6,131,143 A | 10/2000 | Sakai |
| 6,263,404 B1 * | 7/2001 | Borkenhagen et al. ...... 711/137 |
| 6,282,505 B1 | 8/2001 | Hanawa et al. |
| 6,289,420 B1 | 9/2001 | Cypher |
| 6,339,813 B1 | 1/2002 | Smith, III et al. |
| 6,425,055 B1 | 7/2002 | Sager et al. |
| 6,438,671 B1 * | 8/2002 | Doing et al. ................ 711/173 |
| 6,594,728 B1 | 7/2003 | Yeager |
| 6,745,292 B1 * | 6/2004 | Stevens ..................... 711/129 |
| 6,751,700 B2 | 6/2004 | Donoghue et al. |
| 6,754,781 B2 | 6/2004 | Chauvel et al. |
| 6,772,291 B2 | 8/2004 | Palanca et al. |
| 6,857,061 B1 | 2/2005 | Liao et al. |
| 2002/0108021 A1 | 8/2002 | Syed et al. |

\* cited by examiner

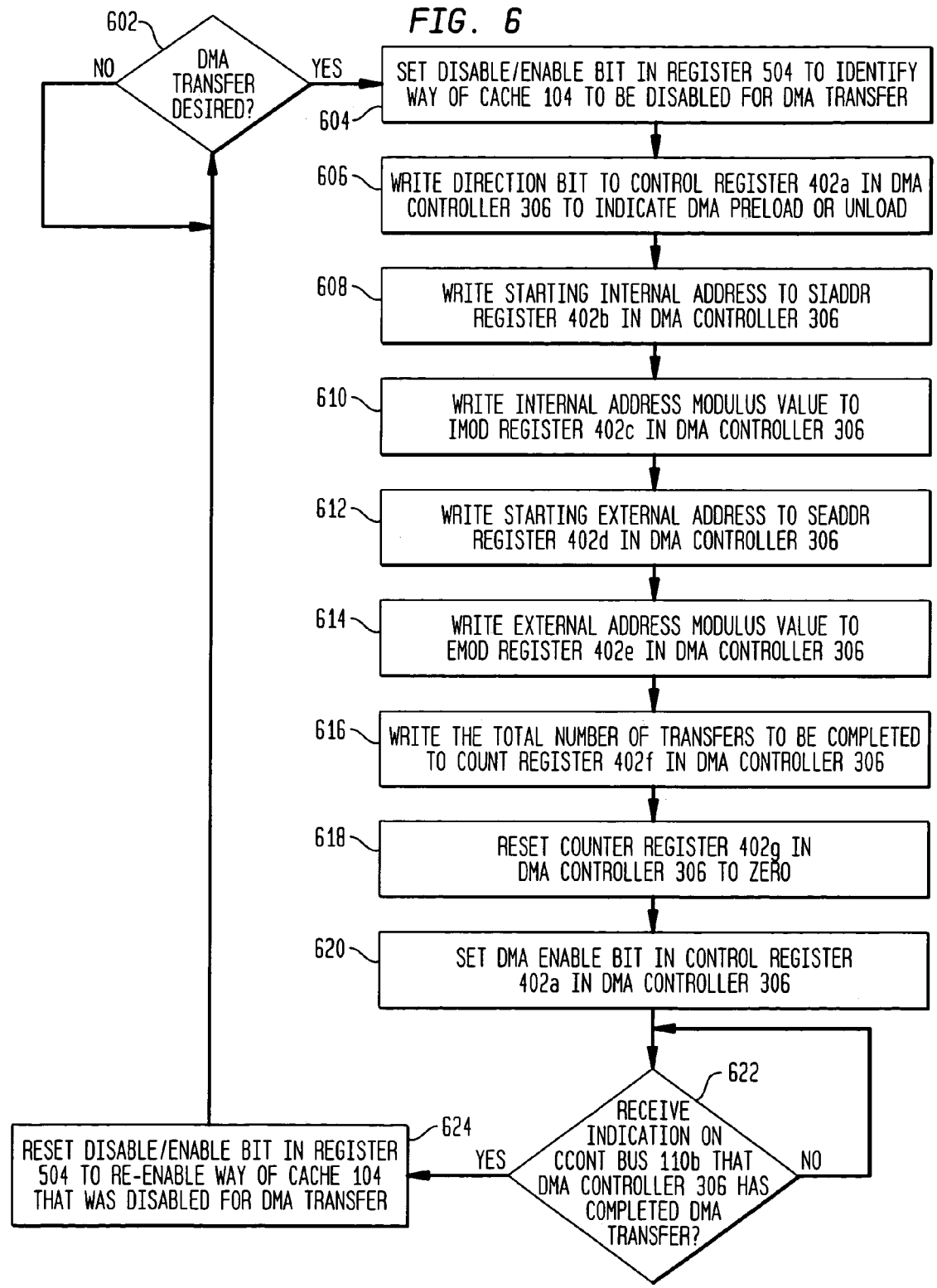

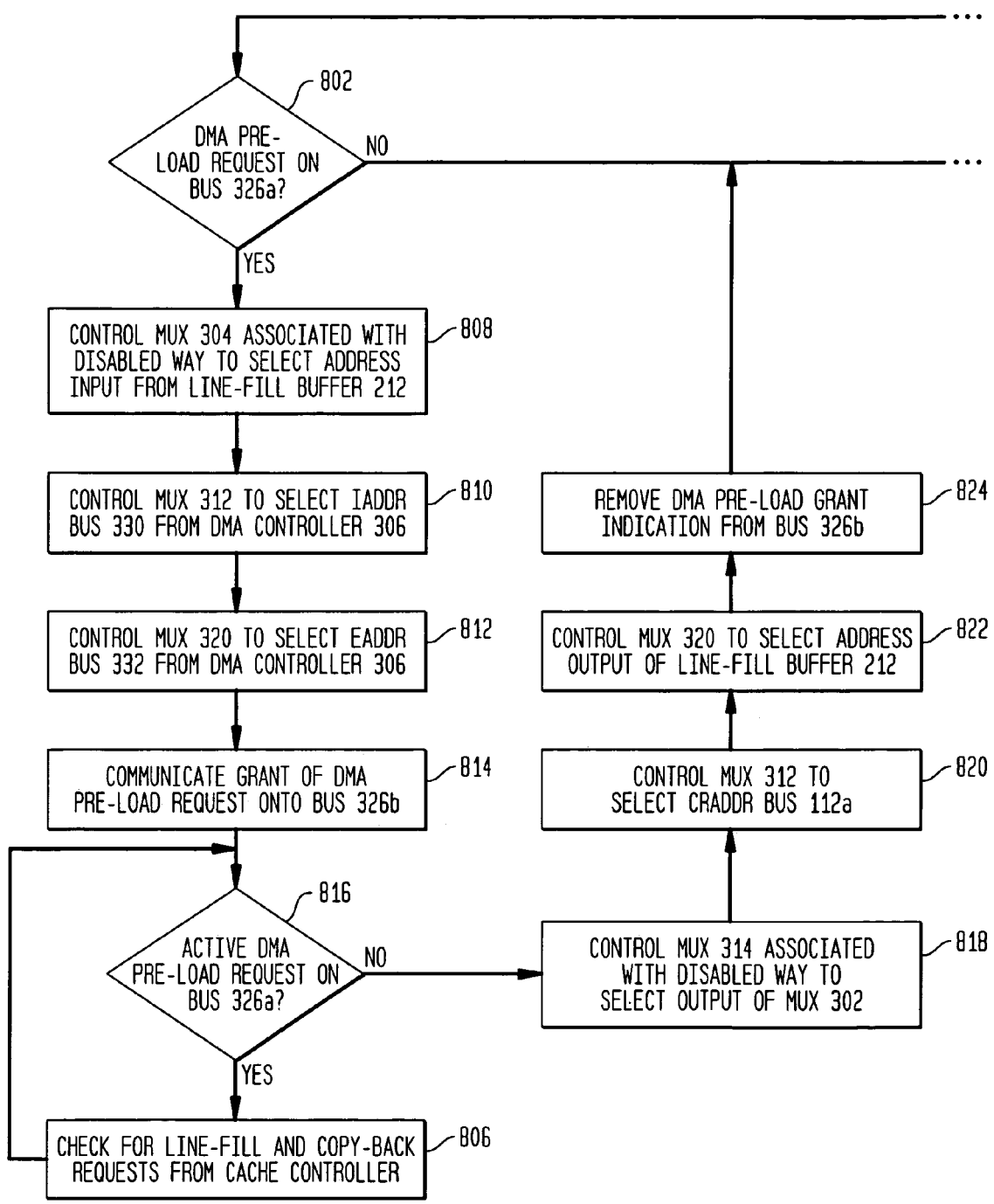
FIG. 8A1

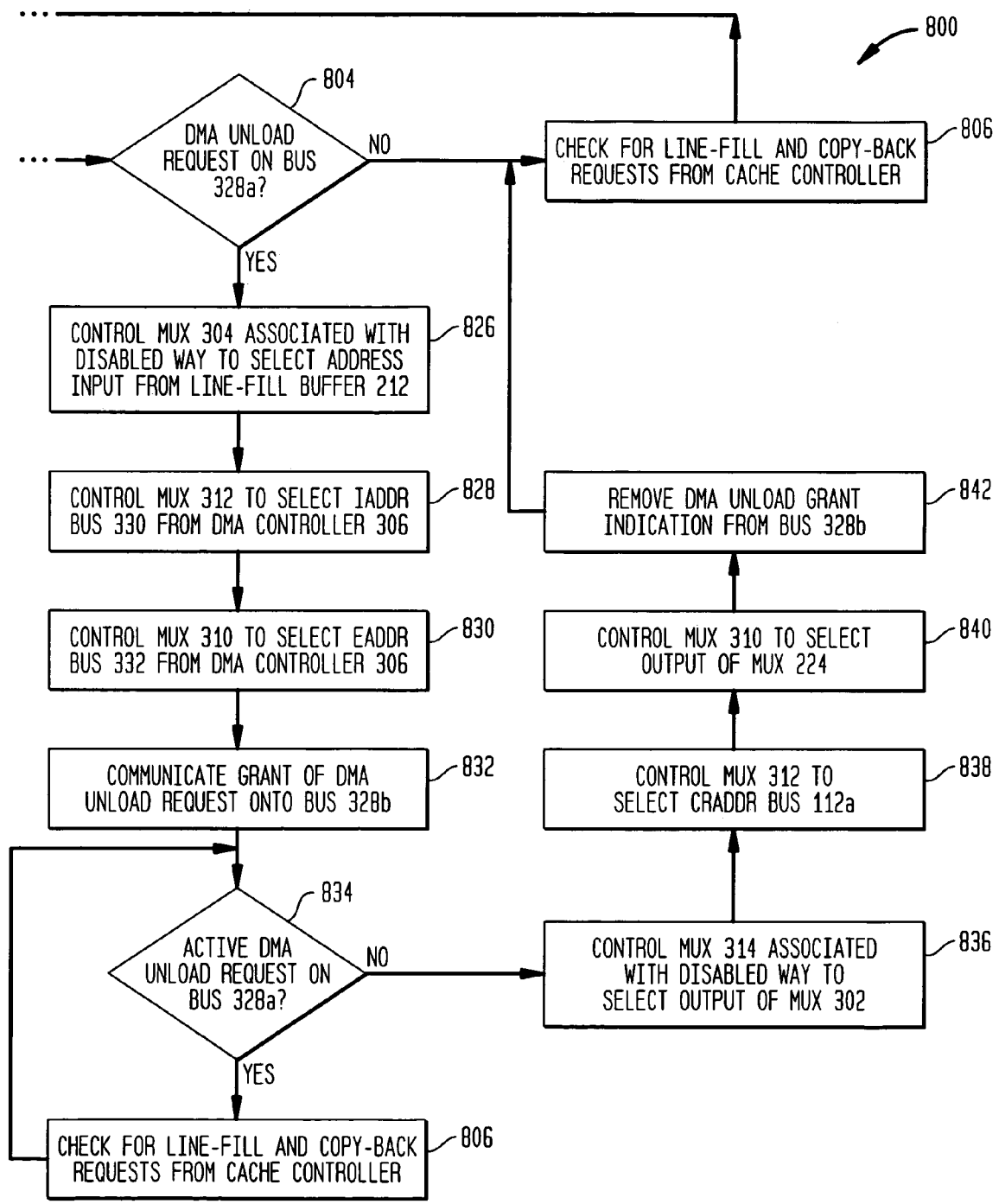
FIG. 8A2

FIG. 8B1
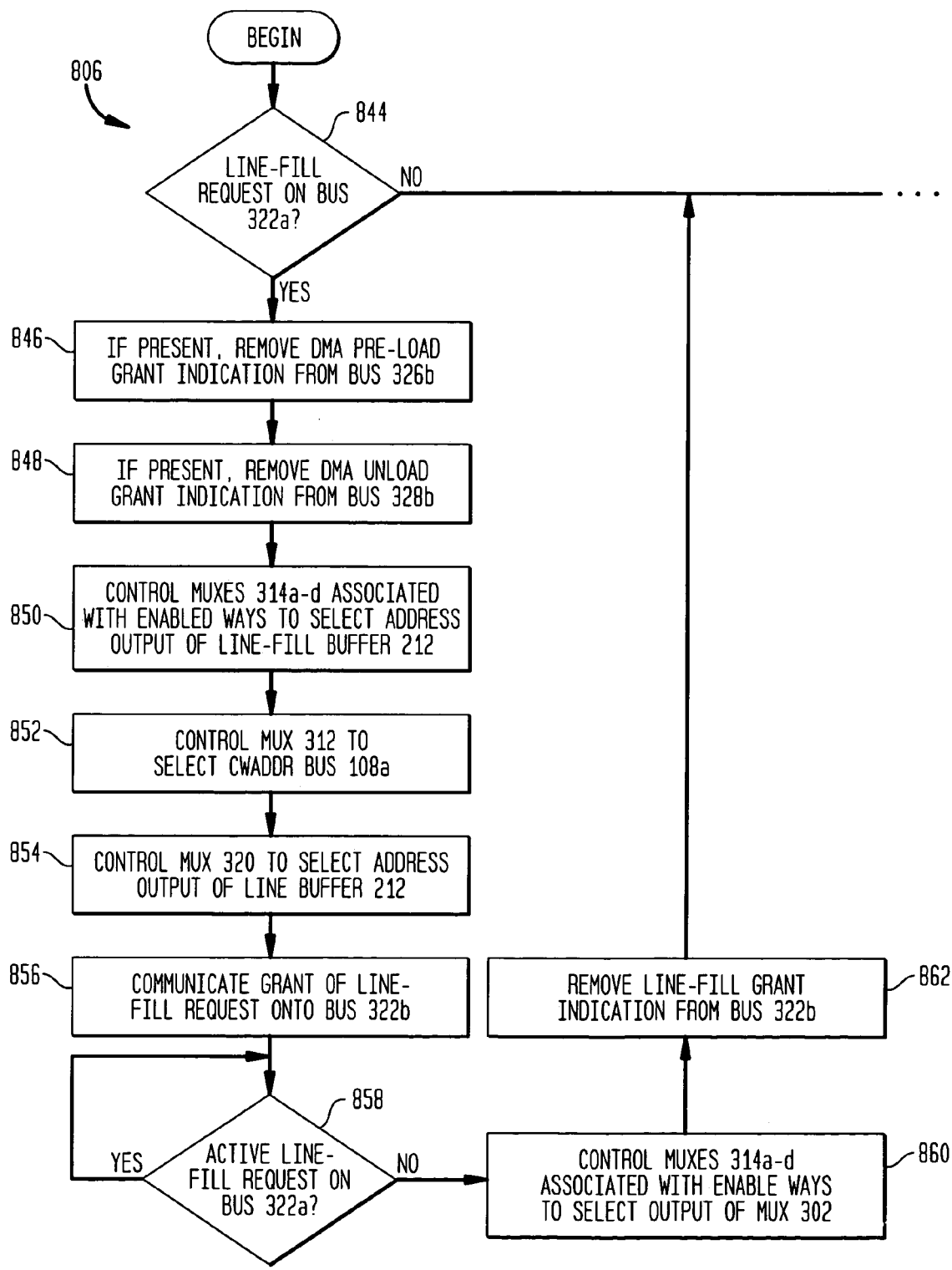

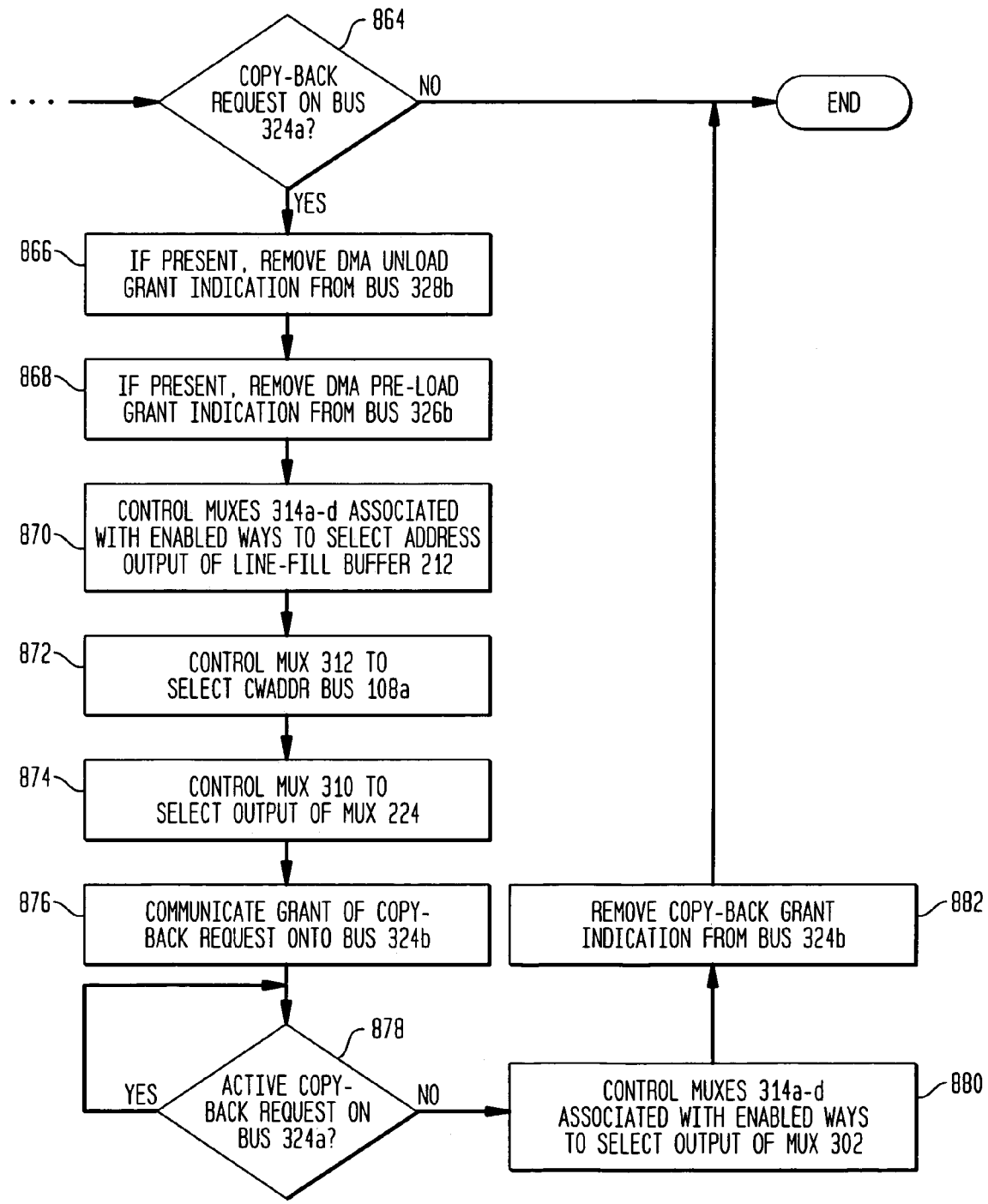
FIG. 8B2

CACHE SYSTEM WITH DMA CAPABILITIES AND METHOD FOR OPERATING SAME

FIELD OF THE INVENTION

The present invention is directed to cache memory systems and methods.

BACKGROUND OF THE INVENTION

In any computer system, at least one controller or central processing unit (CPU) is employed in conjunction with a memory system capable of storing information (data). Generally, the CPU reads data from the memory system, performs an operation based upon the data, and then (possibly) writes the data or a modified version of the data back to the memory system.

The memory system associated with a CPU is typically no more than a collection of storage locations, with each storage location containing a particular number of bits or bytes of data and having a unique numerical address associated with it. Each storage location in a memory system may, for example, contain sixteen bits (two bytes) of data and be uniquely identifiable by a thirty-two bit address. Storage locations of a memory system are commonly referred to as "memory words," and collections of storage locations are commonly called "address spaces." As used herein, a "memory word" is an ordered set of bytes or bits that is the normal unit in which information may be stored, transmitted, or operated on within a computer system, and an "address space" is the collection of memory words that a given CPU in the computer system is able to access. The size of the address space for a CPU is the total number of memory words that are accessible by the CPU.

When a CPU attempts to read the contents of a memory word from a memory system, it is desirable to service the read request as quickly as possible. If the memory word request is not serviced quickly, the CPU may temporarily stall, thereby reducing the ability of the computer system to process information quickly. The "latency" of a memory system is defined as the period of delay between when a CPU first requests a word from memory and when the requested memory word is received and available for use by the CPU. Necessarily, every memory system has some latency associated with it. Two primary goals in memory system design are: (1) to maximize the size of the system's address space, and (2) to minimize the system's latency. It can be difficult to achieve both of these goals, however, given that the latency of a memory system tends to increase with increases in the size of the system's address space.

One way of implementing a large-scale memory system having low latency is to employ a hierarchical memory structure. By placing a small amount of very fast memory between the processor and a larger, slower memory, a memory system can be designed to satisfy most memory access requests at the higher speed of the smaller memory. This can be accomplished by taking advantage of the non-random nature of memory access requests that typically take place in a computer system. Two principles of so-called "locality" can be used to describe the quasi-predictability of memory requests. These principles include (1) spatial locality, and (2) temporal locality.

Spatial locality refers to the fact that, once a particular memory word has been accessed, there exists an increased probability that memory words in close proximity to the accessed memory word will soon be accessed (this is in large part, but not exclusively, a result of the tendency of a CPU to access memory words in sequence). Temporal locality refers to the fact that, once a particular memory word has been accessed, there exists an increased probability that the same memory word will be accessed again in the near future (this is due, at least in part, to the common behavior of software to execute in loops). A wide variety of techniques can be employed (using either hardware, software, or a combination of both) to take advantage of these principles of locality and thereby ensure that most memory access requests are satisfied using the smaller, faster memory, rather than the larger, higher-latency memory.

A hierarchical memory structure can include many levels of memory, with each level typically being larger and slower than the preceding (next lower) level. By properly managing the data stored at each level, the above-discussed principles of locality can be exploited to increase the probability of requested memory words being present at that level. Techniques for managing the various possible hierarchical levels of memory to exploit the principles of locality are well known in the art and therefore will not be discussed further.

Typically, a memory hierarchy begins at the registers of the computer system's CPU(s), followed by one or more levels of "cache" memory. Cache levels may be disposed on the same chip or on the same module as the CPU, or may be entirely distinct from the CPU. Each level of cache may be followed either by another level of cache or by a "main memory" (following the lowest level of cache). The main memory is typically a relatively large semiconductor memory and is generally referred to as the system's random access memory (RAM). Below the main memory, a typical computer system also employs a "virtual memory." A virtual memory may, for example, include a magnetic or optical disk which is used to store very large quantities of data. Because a virtual memory generally includes moving mechanical parts, accesses to this lowest level memory can be on the order of tens of thousands of times slower than accesses to the main memory. As a general rule, as memory access requests go deeper into the memory hierarchy, the requests encounter levels of memory that are substantially larger and slower than the higher memory levels.

At each level of a memory hierarchy, when a word requested by the CPU is present, there is said to be a "hit" at that level. On the other hand, when a requested word is not present at a particular memory level, there is said to be a "miss." When a miss occurs at a memory level, it becomes necessary to look deeper into the memory hierarchy for the requested word. The performance of a given level of a memory hierarchy is commonly evaluated in terms of a so-called "hit ratio," which is calculated by dividing the number of hits encountered during a particular time interval by the total number of access requests made during that interval.

The basic unit of construction of any semiconductor memory device (e.g., a cache or a RAM) is a memory bank. Typically, a memory bank can service only a single request at a time. The time that a memory bank is busy servicing an access request is called the "bank busy time." While both caches and main memories employ memory banks, caches typically have significantly shorter bank busy times than do main memories.

In order to reduce their bank busy times, some memory banks employ multiple (i.e., two or more) so-called "ports" through which accesses to the memory bank can be made concurrently. As used herein, two or more devices are considered to be able to access a memory "concurrently" if each access request made by any of the devices is serviced during a standard access cycle (viewed from the perspective of the accessing devices), without regard to whether any access requests were made by the other device(s) during the same access cycle. Thus, two accesses to a memory are considered concurrent even though the hardware associated with the memory may operate on a higher frequency clock than the accessing devices and therefore service the access requests at slightly different times. Typically, multi-port access is implemented by replicating the word and bit lines of the individual cells of the memory bank so that multiple addresses and memory words may be presented concurrently on the respective ports. However, the addition of ports to a memory bank can increase the size, complexity, and cost of the memory bank to a significant degree.

Caches typically are implemented as "associative" memories. In an associative memory, the address of a memory word is stored along with its data content. When an attempt is made to read a memory word from the cache, the cache is provided with an address and responds by providing data which may or may not be the requested memory word. When the address presented to the cache matches an address currently stored by the cache, a "cache hit" occurs, and the data read from the cache may be used to satisfy the read request. However, when the address presented to the cache does not match an address stored by the cache, a "cache-miss" occurs, and the requested word must be loaded into the cache from the main memory before the requested word can be presented to the CPU.

When a cache-miss occurs, a controller within the cache (the "cache controller") generally causes a large, contiguous block of memory words containing the requested memory word, commonly called a "cache line," to be loaded into the cache from the main memory. A cache line may be as small as a single memory word (i.e., it may include only the requested memory word), or may be as large as several hundred bytes. The number of memory words in a line (the "line size) is generally a power of two. A cache can exploit spatial locality by loading an entire cache line after a cache-miss, rather than loading only the requested memory word. A cache line is said to be aligned if the lowest address in the line is exactly divisible by the line size of the line. That is, a cache line is aligned if, for a line size A beginning at a location B, B mod A=0. In most conventional caches, the cache lines are aligned.

When a cache line is to be loaded into a cache, it is possible that another line must first be transferred out of the cache to make room for the new line. The management of which data is to be transferred out of the cache to make room for new data is typically performed by the cache controller. Because a cache is intended to dynamically select and store the most active portions of a CPU's address space (i.e., the addresses whose contents are accessed the most frequently by the CPU), the determination of which cache line is to be transferred out of the cache is typically based on some attempt to take advantage of temporal locality (discussed above) and thereby ensure that the average latency of the cache is as low as possible. One way this can be accomplished is through the use of a least-recently-used (LRU) policy. Alternative replacement policies may also be used, especially in light of the extensive logic and bookkeeping required to implement true LRU replacement. These and other cache management techniques are well known in the art, and therefore are not discussed further.

In addition to line transfers into the cache in response to attempted reads by the CPU, a cache hit or miss may also occur when the CPU attempts to write a memory word to the cache. That is, when the line in which the to-be-written memory word is included is already present in the cache, a cache hit occurs and the memory word may immediately be written to an appropriate location within the line. On the other hand, when the line in which the to-be-written memory word is not present in the cache, the line in which the memory word is included is typically loaded into the cache from the main memory before the memory word is written to an appropriate location within the line.

Commonly, a cache comprises two distinct memory banks, with one of them serving as a "data array" of the cache, and the other serving as the "tag array." For each cache line present in the data array, a single "tag" is normally stored in the tag array which uniquely identifies the address of that line within the memory system. Therefore, there is typically a one-to-one correspondence between the tags in the tag array and the cache lines in the data array. Other information, for example, state information indicating that a valid cache line is present is typically also stored along with the address. The state information may also, for example, keep track of which cache lines the CPU has modified, thereby facilitating operation of the cache's copy-back functionality, if employed.

To simplify the difficult task of concurrently comparing all of the tags in the tag array with each incoming address, respective memory locations in the main memory may be mapped to one or more cells in the cache so that the contents of each memory location of the main memory can be stored only in the cache cell(s) to which the memory location is mapped, and vice versa. Because the cache is generally much smaller than the main memory, multiple memory locations of the main memory are typically mapped to each cell of the cache. This mapping limits the number of spaces in the cache in which a particular line of data may be stored.

As mentioned above, each memory location of the main memory may be mapped to a single cell in the cache, or may be mapped to one of several possible cells. If each memory location of the main memory is mapped to only a single cell in the cache, there is said to be a direct mapping between the main memory and the cache. In this situation, whenever a line is loaded into the cache from the main memory, the line always is loaded into the same space within the cache. Direct mapping, however, can result in under-utilization of the cache resources when two memory locations are accessed alternately.

When each memory location of the main memory is mapped to multiple locations within the cache, the cache is said to have multiple "ways." In a multiple way cache, whenever a line is loaded into the cache from the main memory, the line may be loaded into any one of the cache's several ways. For example, in an "M-way" associative cache, each memory location of the main memory may be mapped to any of "M" cells in the cache. Such a cache may be constructed, for example, using "M" identical direct-mapped caches. The difficulty of maintaining the LRU ordering of multiple ways of a cache, however, often limits true LRU replacement to 3- or 4-way set associativity.

When an M-way associative cache is employed, each way of the cache must be searched upon each memory access, and, when a cache hit occurs, the data from the appropriate one of the "M" ways of the cache is selected and provided to an output of the cache. On a cache-miss, a choice must be made among the "M" possible cache ways as to which of them will store the new line which the cache controller will transfer into the cache from the main memory.

Write operations from the CPU to the cache may be performed using any of a number of techniques. Using one technique, known as write-through, it is required that the main memory be updated whenever any write is performed to a memory location of the cache. Using a second technique, known as copy-back, the main memory is not required to be updated whenever a write is performed to the cache. Instead, the main memory locations are permitted to become stale (i.e., no longer contain valid data). In such a situation, care must be taken to ensure stale memory locations are not later relied upon as an accurate source of data. Therefore, in a copy-back cache, it is important that altered data in the cache be transferred to the main memory prior to purging the line containing the altered data from the cache.

FIG. 1 shows an example of a prior art computer system 100 including several levels of memory. These levels include: registers (not shown) in the core processor 102, a cache 104, and a main memory 108. As shown, the core processor 102 is connected to the cache 104 via several busses: a core control (CCONT) bus 110, a core read address (CRADDR) bus 112a, a core read data (CRDATA) bus 112b, a core write address (CWADDR) bus 114a, and a core write data (CWDATA) bus 114b.

To request a memory word from the cache 104, the core processor 102 places the address of the desired word on the CRADDR bus 112a, and places an appropriate control signal on the CCONT bus 110. In response to this request, the cache 104 supplies the requested memory word to the core processor 102. The core processor 102 also can write a memory word to the cache 104 by placing the memory word on the CWDATA bus 114b, placing the address of the memory word on the CWADDR bus 114a, and placing an appropriate control signal on the CCONT bus 110.

As illustrated in FIG. 1, the cache 104 is coupled to the main memory 108 via an interface unit 106. In particular, the cache 104 is connected to the interface unit 106 via a first group of busses: a memory control (MCONT) bus 116, a memory load address (MLADDR) bus 118a, a memory load data (MLDATA) bus 118b, a memory store address (MSADDR) bus 120a, and a memory store data (MSDATA) bus 120b. The interface unit 106 is connected to the main memory 108 via a second group of busses: a control bus 122, an address bus 124, and a data bus 126.

If, when the core processor 102 requests a memory word from the cache 104, the requested word is not already present in the cache 104, the cache 104 must retrieve the memory word from the main memory 108 before the cache 104 can pass it on to the core processor 102. This retrieval function may be accomplished, for example, by placing the address of the requested word on the MLADDR bus 118a, and placing an appropriate control signal on the MCONT bus 116. As discussed above, to exploit the principle of spatial locality, rather than retrieving only a single word from the main memory 108, the cache 104 commonly requests that an entire line of memory words (in which the requested word is included) be loaded into the cache 104 from the main memory 108. The details of this so-called "line-fill" operation are typically handled by the interface unit 106, and are well known in the art.

In order to transfer a line of data from the cache 104 to the main memory 108, the cache 104 places an address for the line on the MSADDR bus 120a, places the entire line of to-be transferred data on the MSDATA bus 120b, and places an appropriate control signal on the MCONT bus 116. In response to these signals, the interface unit 106 causes the line of data to be written (using busses 122, 124, and 126) to appropriate memory locations within the main memory 108.

FIG. 2 shows a prior art embodiment of the cache memory 104 of FIG. 1. As shown, the cache 104 includes a data array 204 for storing lines of data, and a tag array 202 for storing tags corresponding to the respective lines of data stored in the data array 204. In the example shown, the cache 104 is a 4-way set associative cache memory. Thus, the tag and data arrays 202 and 204 are each divided into four ways 232a–d and 234a–d to store tags and data for the respective ways of the cache 104. The cache 104 also includes a cache controller 208. The cache controller 208 is typically responsible for virtually all control functions that are performed within the cache 104, such as the control of multiplexers 218, 220, 222, 224, 226, 230, and 238, the control of reading and writing operations to the tag array 202 and the data array 204, and the control of latches constituting the various buffers within the cache 104 (e.g., store buffer 210, load buffer 212, copy-back buffer 214, and write buffer 216). The connections between the cache controller 208 and the other elements in the cache 104 that are used to effect these control functions are represented in FIG. 2 by lines 236a–d.

Preceding the tag array 202 is a decoder 206. The decoder 206, based upon an incoming address selected by the multiplexer 218, identifies the four spaces in each of the tag and data arrays (i.e., one space for each of the four ways of the cache) in which the tag and data corresponding to the incoming address may possibly be stored. The tags and data from the four identified spaces then are provided to inputs of the multiplexers 224 and 226, respectively. The selected incoming address is then compared (using comparators 232a–d) with the four tags read from the tag array 202, and the results of these comparisons are provided to an OR gate 228. Therefore, the output of the OR gate 228, which is provided to the cache controller 208, indicates whether a cache hit or a cache-miss has occurred for the incoming address selected by the multiplexer 218. It should be appreciated that the cache controller 208 also typically monitors the results of the comparisons performed by the comparators 232a–d so as to enable it to properly control the multiplexers 224 and 226 to select the output of the way of the cache 104 that generated a particular hit.

When the core processor 102 (FIG. 1) submits a read request to the cache 104, the cache controller 208 causes the multiplexer 218 to select the incoming address from the CRADDR bus 112a as the input to the decoder 206. As mentioned above, to submit such a read request to the cache 104, the core processor 102 places the address of the requested memory word on the CRADDR bus 112a, and places an appropriate control signal on the CCONT bus 110. For a read operation, the cache controller 208 also causes the multiplexer 238 to select as its output the address provided on the CRADDR bus 112a. In this manner, the incoming address may be temporarily stored in the line buffer 212 for use if and when a cache-miss occurs (as explained below) during the read operation by the core processor 102.

If, in response the multiplexer 218 selecting the address from the CRADDR bus 112 as the input to the decoder 206, a cache hit occurs, the cache controller 208 then causes the multiplexer 226 to select as its output the data from the way 234 of the data array 204 in which the cache hit occurred. The data so selected is then provided to the core processor 102 via the CRDATA bus 112b. If, on the other hand, the core processor 102 submits a read request to the cache 104, and a cache-miss occurs, it then becomes necessary to load a line of data into the cache 104 from the main memory 108 prior to fulfilling the read request. Because, as explained above, the address of the requested memory word is already present in the line buffer 212 (which is coupled to the interface unit 106 via the MLADDR bus 118a), the cache controller 208 need only supply an appropriate control signal to the interface unit 106 via the MCONT bus 116 to effect this line-fill operation. In response to receiving the line-fill request from the cache controller 208, the interface unit 106 returns the requested line of data on the MLDATA bus 118b after having retrieved it from the main memory 108.

The line of data received from the main memory 108 via the interface unit 106 is temporarily stored in the line buffer 212 (along with the address associated with the data) prior to being written to the data array 204. Therefore, once data has been loaded into the line buffer, the line buffer simultaneously contains the address and data of the to-be-loaded line.

Before loading the line into the cache 104, the cache controller 208 causes the multiplexer 218 to select the address output of the line buffer 212 as the input to the decoder 206. The cache controller 208 also causes the appropriate ones of the multiplexers 220a–d and 222a–d to select, respectively, the address and data outputs of the line buffer 212 as the write inputs to the tag and data arrays 202 and 204. By properly controlling the multiplexers 220 and 222, the cache controller 208 makes a determination as to which of the four ways of the cache 104 the incoming information is to be written. The cache controller 208 then may effect the write operation of both the tag and data to the selected way.

When the core processor 102 (FIG. 1) submits a write request to the cache 104, the cache controller 208 causes the multiplexer 218 to select the address output of the store buffer 210 (i.e., the address from the CWADDR bus 114a) as the input to the decoder 206. As mentioned above, to submit such a write request to the cache 104, the core processor 102 places the address of the to-be-written memory word on the CWADDR bus 114a, places the memory word itself on the CWDATA bus 114b, and places an appropriate control signal on the CCONT bus 110. In response to these events, the memory word and its address are temporarily stored in the store buffer 210. As with the cache read situation, the cache controller 208 controls the multiplexer 238 such that each address provided on the CWADDR bus 114a is also temporarily stored in the line buffer 212 in case it becomes necessary to perform a line fill operation in response to a cache-miss.

If, in response to the multiplexer 218 selecting the address output of the store buffer 210 as the input to the decoder 206, a cache hit occurs, the cache controller 208 can immediately cause the memory word in the store buffer 210 to be written (via one of the multiplexers 222a–d) to the line already existing in the cache 104. If, on the other hand, a cache-miss occurs when the core processor 102 submits a write request to the cache 104, the line of data in which the memory word is to be included must first be loaded into the cache 104 from the main memory 108 prior to writing the memory word to that line. As with the line-fill operation performed when a cache-miss occurs in response to a read request by the core processor 102, because, as mentioned above, the address of the to-be-written memory word is already stored in the line buffer 212 (which is coupled to the interface unit 106 via the MLADDR bus 118a), the cache controller 208 need only supply an appropriate control signal to the interface unit 106 via the MCONT bus 116 to load the line into the cache 104 from the main memory 108. In response to the line-fill request from the cache controller 208, the interface unit 106 returns the line of data in which the memory word is to be written on the MLDATA bus 118b after having retrieved it from the main memory 108.

After the appropriate line of data from the main memory 108 (and associated address) are stored in the line buffer 212, this information can be transferred to one of the ways of the tag and data arrays 202 and 204 via multiplexers 220 and 222. Finally, after the appropriate line has been loaded into cache, the memory word in the store buffer 210 can be written into the now-present line as if a cache hit had occurred in the first place.

The write buffer 216 of FIG. 2 is typically used only when the core processor 102 desires to write a memory word to the main memory 108 without also storing that memory word in the cache 104, i.e., when it wishes to bypass the cache 104 entirely. To accomplish this, the core processor 102 places the address of the to-be-written memory word on the CWADDR bus 114a, places the memory word itself on the CWDATA bus 114b, and places an appropriate control signal on the CCONT bus 110. Next, the address and data from the store buffer 210 are transferred to the write buffer 216, and the cache controller 208 controls the multiplexers 230a–b to select as their outputs the address and data outputs, respectively, of the write buffer 216. The cache controller 208 then places an appropriate control signal on the MCONT bus 116 to instruct the interface unit 106 to write the memory word on the MSDATA bus 120b to the address provided on the MSADDR bus 120a.

We have recognized that, in some circumstances, it may be desirable for a memory system to have not only a low latency on average for all memory accesses, but to have a guaranteed low latency for every memory access. In other words, it can be desirable in some circumstances for a memory system to be highly deterministic as well as very fast. For example, many digital signal processing (DSP) applications require data buffers, coefficients, etc., to be available in local memory before the application actually references this data and must wait for the data to be present in the local memory before they can continue processing.

In such circumstances, we have recognized that traditional caches, such as the cache described above, are not a desirable design choice because, while accesses that result in hits are serviced extremely fast in these systems, accesses that result in misses are serviced much more slowly. Therefore, the processor in such a system cannot count on having a memory access serviced any faster than the time taken to service a cache-miss. It may thus be necessary to operate the processor at a relatively slow speed so as to give each memory access sufficient time to complete.

In addition, we have recognized that, in some DSP applications, the temporal locality of data tends to be relatively poor. Therefore, the dynamic, on-demand fill characteristic of a traditional cache memory are not necessarily beneficial in such applications. Thus, for many DSP applications, the use of a traditional cache memory is not a desirable design choice.

In light of the above, such DSP applications typically have employed SRAMs, rather than caches, as local memory. By properly paging memory words from the main memory to the local SRAM, and vice versa, the DSP core processor can be given access to the memory words it requires using the relatively fast and highly deterministic local SRAM. This paging function has traditionally been achieved by employing a direct memory access (DMA) controller to manage data transfers on behalf of, and in parallel with, the DSP core processor. The tasks of managing these exchanges of memory words and re-mapping addresses, however, can be burdensome for a software programmer, and the risk of making errors in performing them is significant. Such errors can result in poor performance or complete failure of the DSP application.

In an effort to simplify the general programming model and improve competitiveness, some DSPs are now integrating cache, rather than simple SRAMs, as local memory. One benefit of using a cache rather than an SRAM as local memory is the elimination of the difficulty of re-mapping addresses that is inherent in the use of an SRAM as local memory. However, the above-noted drawbacks of using cache memories in connection with certain DSP applications still exist in such systems.

What is needed, therefore, is an improved cache memory system and method of using the same.

SUMMARY OF THE INVENTION

According to one aspect of the present invention, a cache memory system includes a plurality of memory locations to store data and addresses associated with the data; a first controller that controls access to the plurality of memory locations by a first device; and a second controller that operates independently of the first controller and controls access to the plurality of memory locations by a second device.

According to another aspect of the invention, a cache memory system includes a plurality of memory locations to store data and addresses associated with the data; an address input that receives addresses from either one of a first device and a second device, the addresses provided on the address input identifying memory locations to be accessed; and at least one first multiplexer that selects addresses to be provided to the address input from among addresses provided by the first device and addresses provided by the second device.

According to another aspect of the invention, a cache memory system includes a plurality of memory locations to store data and addresses associated with the data; an address output for outputting addresses retrieved from memory locations along with data associated therewith; and at least one multiplexer that selects external addresses to be provided to a first device from among the addresses provided at the address output and external addresses provided by a second device.

According to another aspect of the invention, a method includes an act of accessing memory locations of an associative cache independently of a cache controller that controls access to memory locations of the cache by a processor.

According to another aspect of the invention, a method includes acts of selecting addresses to be provided to an address input of an associative cache from among addresses provided by a first device and addresses provided by a second device; and accessing memory locations within the cache based upon the selected addresses provided to the address input of the cache.

According to another aspect of the invention, a method includes acts of outputting addresses retrieved from memory locations of a cache along with data associated therewith; and selecting external addresses to be provided to a first device from among the addresses output from the cache and external addresses provided by a second device.

According to another aspect of the invention, a cache memory system includes a plurality of memory locations to store data and addresses associated with the data; and means for accessing memory locations of the cache independently of a cache controller that controls access to memory locations of the cache by a processor.

According to another aspect of the invention, a cache memory system includes a plurality of memory locations to store data and addresses associated with the data; an address input that receives addresses from either one of a first device and a second device, the addresses provided on the address input identifying memory locations to be accessed; and means for selecting addresses to be provided to the address input from among addresses provided by the first device and addresses provided by the second device.

According to another aspect of the invention, a cache memory system includes a plurality of memory locations to store data and addresses associated with the data; an address output for outputting addresses retrieved from memory locations along with data associated therewith; and means for selecting external addresses to be provided to a first device from among the addresses output from the cache and external addresses provided by a second device.

According to another aspect of the invention, a cache memory system includes a data array including memory locations for storing data; a tag array including memory locations for storing tags associated with the data stored in the data array; a first controller that controls access to the tag and data arrays by a first device; a second controller that controls access to the tag and data arrays by a second device; and a third controller that controls arbitration for cache resources shared by the first and second controllers.

According to another aspect of the invention, a cache memory system includes a plurality of memory locations to store data and addresses associated with the data; and a controller that controls access to the plurality of memory locations by a device, the controller being configured to provide at least one first address identifying at least one memory location of the device from which data sets are to be transferred, and at least one second address identifying at least one memory location of the cache to which the data sets are to be transferred, the controller being further configured such that the second address can be incremented or decremented between consecutively transferred data sets without also incrementing or decrementing the first address between the consecutively transferred data sets.

According to another aspect of the invention, a cache memory system includes a plurality of memory locations to store data and addresses associated with the data; and a controller that controls access to the plurality of memory locations by a device, the controller being configured to provide at least one first address identifying at least one memory location of the device from which data sets are to be transferred, and at least one second address identifying at least one memory location of the cache to which the data sets are to be transferred, the controller being further configured such that the second address can be incremented or decremented between consecutively transferred data sets by a different amount than the first address is incremented or decremented between the consecutively transferred data sets.

According to another aspect of the invention, a cache memory system includes a plurality of memory locations to store data and addresses associated with the data; means for controlling access to the plurality of memory locations by a device; means for providing at least one first address identifying at least one memory location of the device from which data sets are to be transferred, and at least one second address identifying at least one memory location of the cache to which the data sets are to be transferred; and means for incrementing or decrementing the second address between consecutively transferred data sets without also incrementing or decrementing the first address between the consecutively transferred data sets.

According to another aspect of the invention, a cache memory system includes a plurality of memory locations to store data and addresses associated with the data; means for controlling access to the plurality of memory locations by a device; means for providing at least one first address identifying at least one memory location of the device from which data sets are to be transferred, and at least one second address identifying at least one memory location of the cache to which the data sets are to be transferred; and means for incrementing or decrementing the second address between consecutively transferred data sets by a different amount than the first address is incremented or decremented between the consecutively transferred data sets.

According to another aspect of the present invention, a cache memory system includes a plurality of memory locations for storing data and addresses associated with the data, each of the plurality of memory locations having only a single word line associated therewith; and at least one controller that enables first and second devices to access different ones of the plurality of memory locations concurrently.

According to another aspect of the invention, a cache memory system includes a plurality of memory locations to store data and addresses associated with the data; a plurality of cache outputs for providing data retrieved from the memory locations; and first and second multiplexers having multiplexer inputs coupled to at least some of the memory locations and multiplexer outputs coupled to the plurality of cache outputs so as to enable the first and second multiplexers to select data from different ones of the plurality of memory locations to be provided concurrently on respective ones of the plurality of cache outputs.

According to another aspect of the invention, a cache memory system includes a data array for storing data; a tag array for storing tags associated with the data stored in the data array; a load buffer coupled to the tag and data arrays to load tags and data into the tag and data arrays; and a first multiplexer having an output coupled to an address input of the load buffer, the first multiplexer receiving as inputs first and second addresses from respective first and second sources, and providing as its output a selected one of the first and second addresses.

According to another aspect of the invention, a cache memory system includes a data array for storing data; a tag array for storing tags associated with the data stored in the data array; a load buffer coupled to the tag and data arrays to load tags and data into the tag and data arrays; and a multiplexer having a first input coupled to an address output of the load buffer to receive first addresses therefrom and a second input coupled a source of second addresses, the multiplexer providing as its output a selected one of the first and second addresses.

According to another aspect of the invention, a cache memory system includes a data array for storing data; a tag array for storing tags associated with the data stored in the data array; a copy-back buffer coupled to the tag and data arrays to receive tags and data therefrom so that the received data can be transferred from the data array to a lower-level memory; and a multiplexer having an output coupled to an address input of the copy-back buffer, the multiplexer receiving as inputs first addresses from the tag array and second addresses from a source distinct from the tag array, and providing as its output a selected one of the first and second addresses.

According to another aspect of the invention, a cache memory system includes a data array for storing data; a tag array for storing tags associated with the data stored in the data array; and at least first and second decoders adapted to receive and decode at least first and second respective addresses, the first decoder identifying, in response to receiving first addresses, first locations in the tag array and first locations in the data array corresponding to the first locations in the tag array, and the second decoder identifying, in response to receiving second addresses, second locations in the tag array and second locations in the data array corresponding to the second locations in the tag array.

According to another aspect of the invention, a cache memory system includes a data array including a first plurality of memory locations for storing data; a tag array including a second plurality of memory locations for storing tags associated with the data stored in the data array; and at least one controller configured to place the system in at least first and second states, wherein, in the first state, a first device has exclusive access to a first subset of the first plurality of memory locations and a second device has access to a second subset of the first plurality of memory locations, and, in the second state, the second device has access to at least one memory location in the first subset of the first plurality of memory locations.

According to another aspect of the invention, a method of operating an associative cache in which each of a plurality of memory locations has only a single word line associated therewith includes an act of concurrently accessing with first and second devices different ones of a plurality of memory locations of the cache.

According to another aspect of the invention, a method of operating an associative cache in which each of a plurality of memory locations has only a single word line associated therewith includes an act of concurrently providing data from different ones of the plurality of memory locations to respective devices via a plurality of outputs of the cache.

According to another aspect of the invention, a method of operating an associative cache in which each of a plurality of memory locations has only a single word line associated therewith includes an act of using multiple decoders to decode respective addresses provided to the cache.

According to another aspect of the invention, a cache memory system includes a plurality of memory locations for storing data and addresses associated with the data, each of the plurality of memory locations having only a single word line associated therewith; and means for enabling first and second devices to access different ones of the plurality of memory locations concurrently.

According to another aspect of the invention, a cache memory system includes a plurality of memory locations for storing data and addresses associated with the data, the memory locations being configured and arranged to be included in at least first and second ways normally accessible by a processor; means for selectively preventing the processor from accessing the first way while permitting the processor to access the second way; and means, distinct from the processor, for accessing the first way while the processor is prevented from accessing the first way.

According to another aspect of the invention, a method of operating an associative cache includes acts of (A) preventing the processor from accessing a first way of the cache while permitting the processor to access a second way of the cache; (B) while the processor is prevented from accessing the first way but is permitted to access the second way, permitting a device other than the processor to access the first way; and (C) at a time when the step (A) is not being performed, permitting the processor to access the first way.

BRIEF DESCRIPTION OF THE DRAWINGS

FIG. 6 is a flow chart illustrating an example of a routine that may be executed by a core processor to practice an embodiment of the invention;

FIGS. 8A–B are flow charts illustrating an example of a routine that may be executed by the Pre-load controller of FIG. 5 to practice an embodiment of the invention.

DETAILED DESCRIPTION

Figure 1:
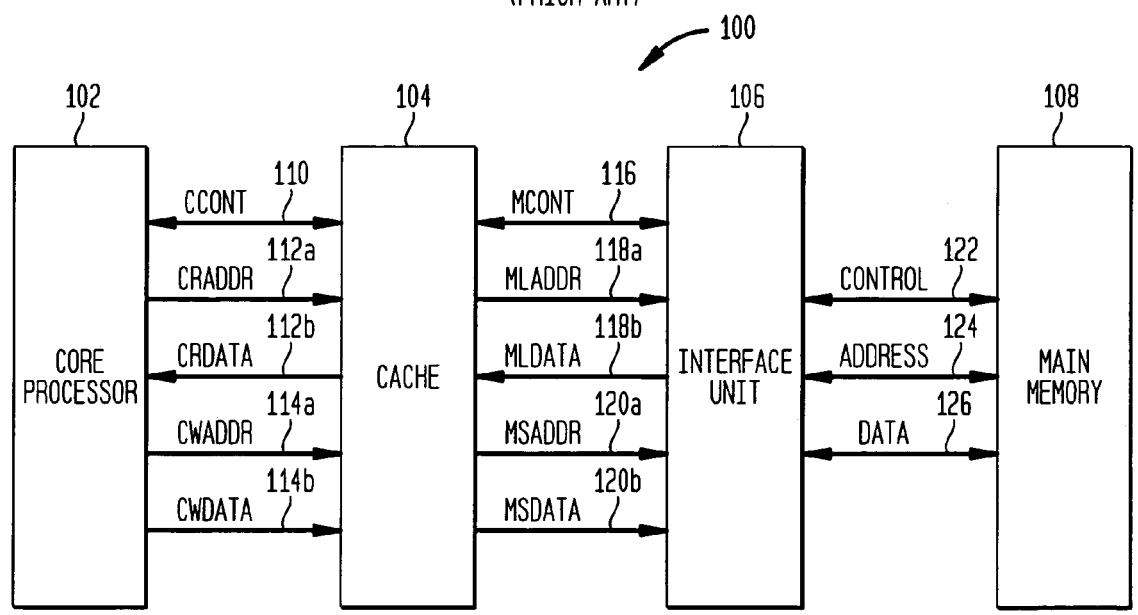
FIG. 1 is a block diagram of a prior art computer system including a cache.

At the outset, it should be understood that the above discussion of the prior art is intended to provide a context for a discussion of the present invention, and to provide a number of examples of prior art systems in which aspects and features of the present invention may be incorporated and employed. The discussion of the prior art is not intended in any way to be limiting on the scope of the appended claims or restrictive as to the possible applications of the present invention. It should further be appreciated that any of the above-described features or aspects of prior art caches and prior art systems in which caches are used may, in fact, be employed in connection with various embodiments of the present invention, and that the invention is not limited to the specific features and aspects of the prior art that are incorporated in the illustrative embodiment of the invention described below.

According to one aspect of the present invention, a cache memory system is provided in which a cache can be dynamically pre-loaded with data from the main memory in parallel with accesses to the cache by a core processor. In this manner, the pre-load function can make the data available to the processor application before the application references the data, thereby potentially providing a 100% cache hit ratio, since the correct data is pre-loaded into the cache. In addition, if a copy-back cache is employed, the cache memory system may also be configured such that processed data can be dynamically unloaded from the cache to the main memory in parallel with accesses to the cache by the core processor.

The pre-loading and/or post unloading of data may be accomplished, for example, by using a DMA controller to burst data into and out of the cache in parallel with accesses to the cache by the core processor. In accordance with one aspect of the invention, this DMA control function may be integrated into the existing cache control logic of a prior art cache such as that shown in FIG. 2 so as to reduce the complexity of the cache hardware (e.g., as compared to a multi-port cache), and to alleviate the difficulty associated with addressing the non-contiguous internal address map of the cache.

We have recognized that the cache-miss hardware of such a prior art cache already provides much of the datapath and control required to implement the DMA function. By providing a few additional control registers, under control of software, and additional state control logic, a DMA controller can use the existing cache-miss hardware to burst data into/out of the cache (largely) transparent to the core. The DMA controller may, for example, arbitrate with the existing cache controller for use of the miss hardware. For maximum performance, the programmer can optimize cache utilization such that the core processor hits in the cache up to 100%, while the DMA controller pre-loads another region of the cache (and/or unloads another region of the cache), using the existing cache-miss hardware. This arrangement effectively permits the cache to operate as if it has two ports.

In one illustrative embodiment, a section of the cache (e.g., one of the "M" ways of the cache) is temporarily disabled from the perspective of the core processor (i.e., the core processor cannot read or write data to it), while the remainder of the cache (e.g., the other "M−1" ways of the cache) remains enabled, permitting the core processor to continue reading data from and writing data to these section (s) of the cache. The disabled section of the cache is then available for unloading to the main memory and/or pre-loading from the main memory. After the disabled section of the cache has been unloaded and/or pre-loaded it may then be re-enabled for normal operation and another section of the cache may be disabled for unloading and/or pre-loading. Ideally, a section of the cache containing data that has already been used by the application is selected for each unloading or pre-loading operation. This process of cycling through cache sections to unload data therefrom or pre-load data thereto may continue as long as the application needs data.

Figure 2:
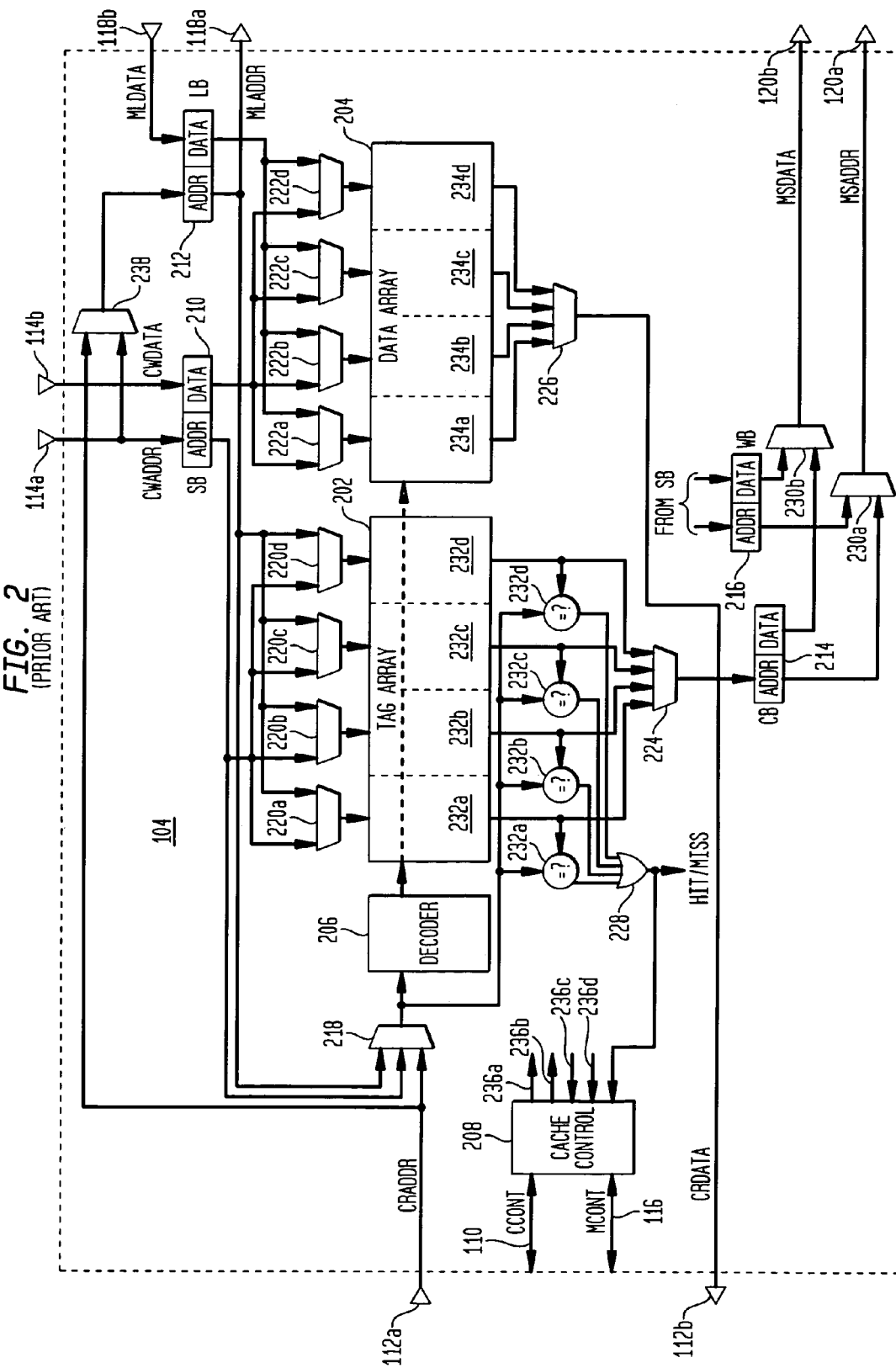
FIG. 2 is a partial-schematic/partial-block diagram of a prior art cache such as that shown in FIG. 1.

As mentioned above, one embodiment of the invention takes advantage of the cache-miss reload/copyback hardware and the ports to the tag and data arrays that already exist in prior art caches such as that shown in FIG. 2. As discussed below, this embodiment of the invention may be implemented by adding only a few multiplexers, control registers and control logic circuits to a prior art cache, thereby making it a relatively inexpensive, as well as extremely effective, solution. It should be appreciated, of course, that the invention is not limited in this respect, and that separate hardware and/or ports may be employed in alternative embodiments to accomplish the same result.

Figure 3A:
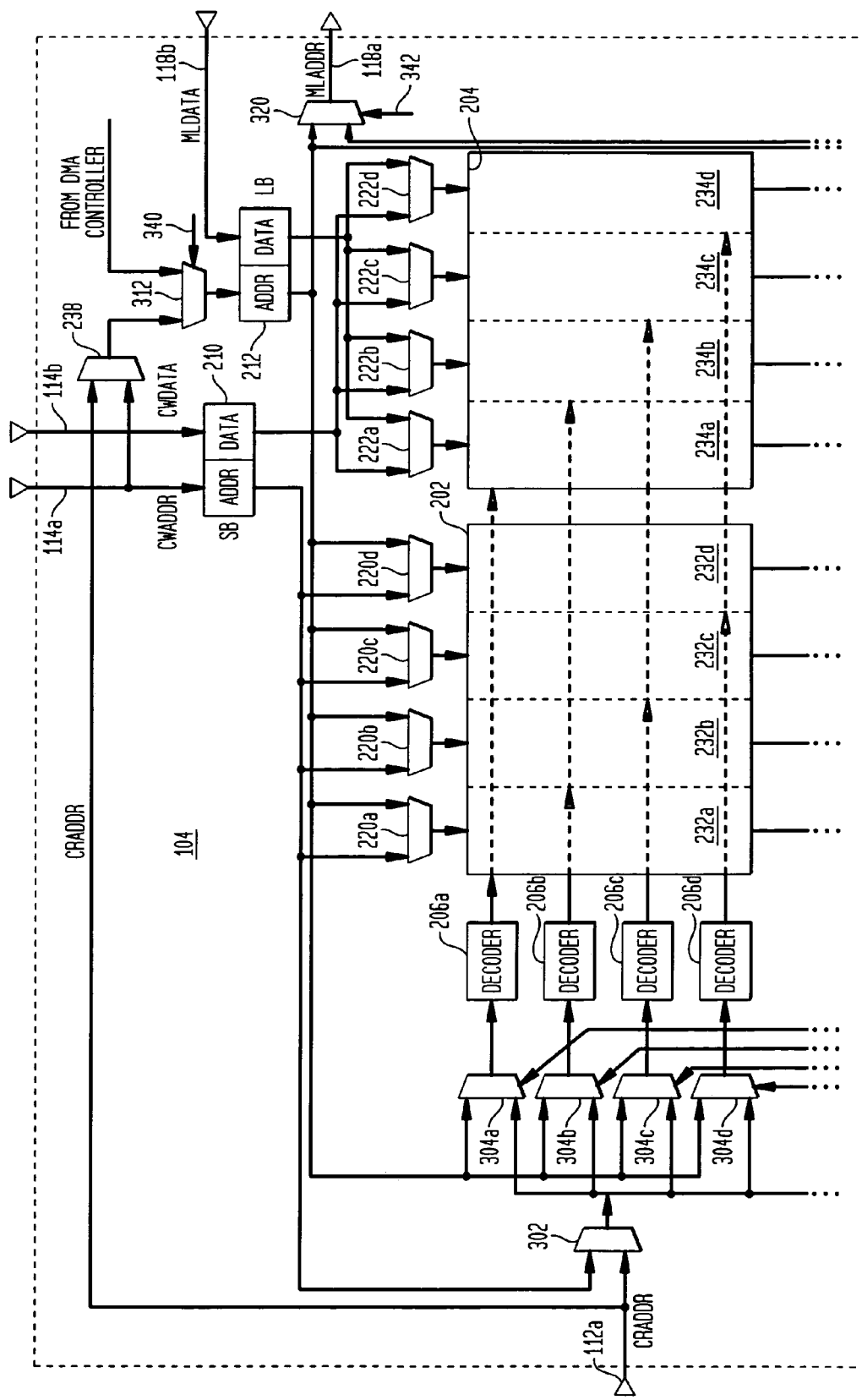
FIG. 3 is a partial-schematic/partial-block diagram of a cache memory that embodies various aspects of the present invention.
Figure 3B:
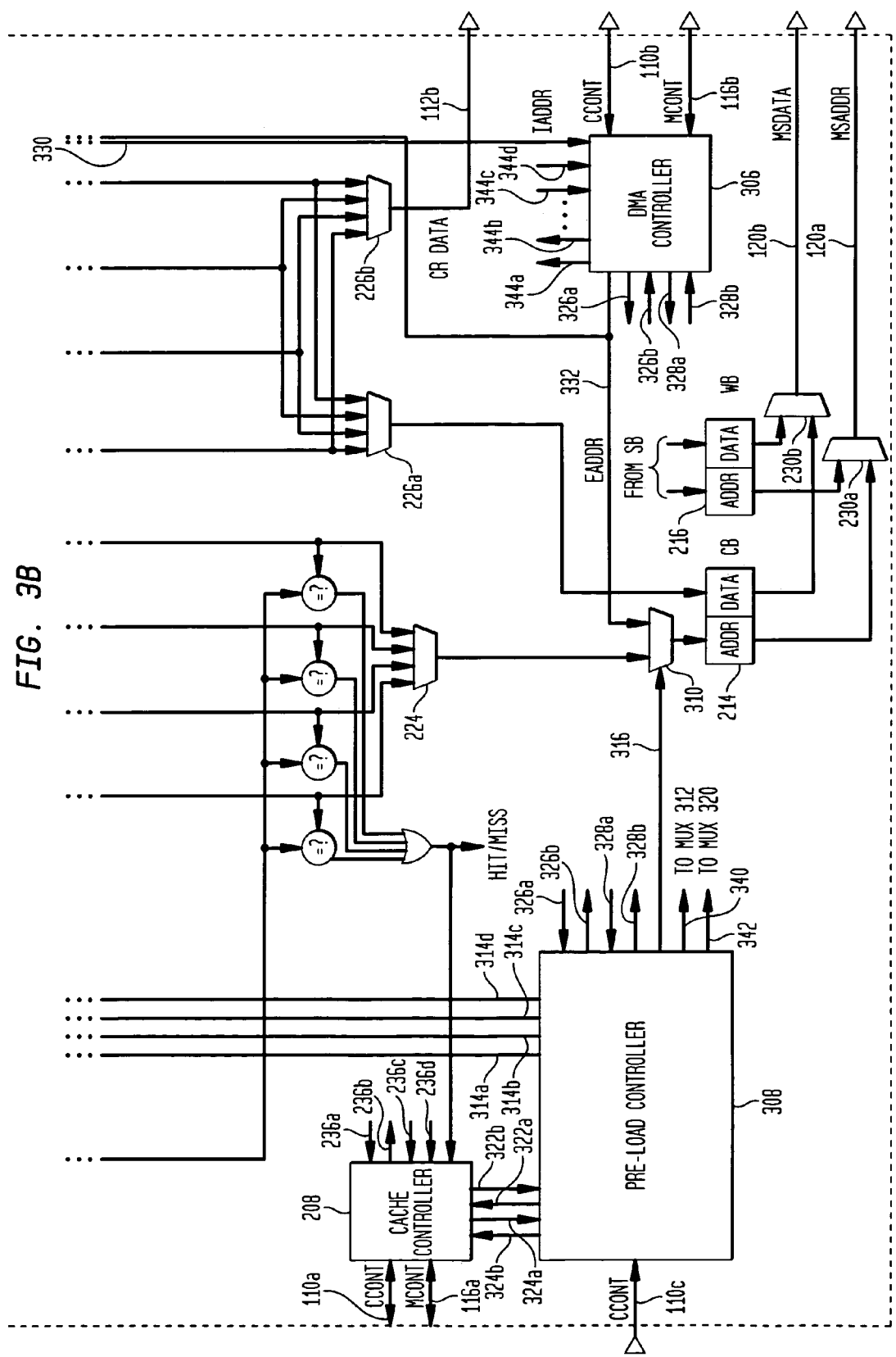

An illustrative example of a cache 104 in which various aspects of the present invention are embodied is shown in FIG. 3. In the illustrative embodiment shown in FIG. 3, the cache 104 includes multiple (i.e., four) decoders 206a–d. In this example, a separate decoder is provided for each of the four ways of the cache 104. Additionally, the cache 104 in the embodiment of FIG. 3 includes a first multiplexer 302, followed by four additional multiplexers 304a–d, with one of the multiplexers 304a–d preceding each of the decoders 206a–d.

The use of the multiple decoders 206a–d in the cache 104 of FIG. 3 permits the different ways of the tag and data arrays 202 and 204 to be accessed concurrently using different addresses. The arrangement of multiplexers 302 and 304a–d permits different incoming addresses to be selected and provided to the respective decoders 206a–d. Specifically, the multiplexer 302 determines whether the address from the CRADDR bus 112a or address from the CWADDR bus 114a (via the store buffer 210) is provided as one of the inputs to all four of the multiplexers 304a–d, and each of the multiplexers 304a–d determines whether the output from multiplexer 302 or the address output of the load buffer 212 is provided as the input to the decoder 206 with which it is associated.

In the embodiment shown, when one of the multiplexers 304a–d is controlled so as to select as its output the address output of the load buffer 212, the core processor 102 is effectively prevented from reading data from or writing data to the way of the cache 104 associated with that multiplexer (and corresponding decoder 206). For the multiplexers 304a–d that select as their outputs the output of the multiplexer 302, however, the core processor 102 can perform normal read and write operations to the ways of the cache associated with those multiplexers 304 (and corresponding decoders 206).

For example, when the multiplexer 304a selects as its output the address output of the load buffer 212, and the remaining multiplexers 304b–d select as their outputs the output of the multiplexer 302, the core processor 102 is prevented from performing normal read and write operations to the ways 232a and 234a of the tag and data arrays 202 and 204, respectively, but is permitted to perform such read and write operations to the ways 232b–d and 234b–d of the tag and data arrays 202 and 204. Note that either a read operation or a write operation can be performed by the core processor 102 from or to any one of the "enabled" ways of the cache 104 by selecting the CRADDR bus 112a or the CWADDR bus 114a (via the store buffer 210), respectively, as the output of the multiplexer 302.

Each of the multiplexers 304a–d is controlled by a respective output 314a–d of a pre-load controller 308 (described below). In the embodiment shown, the pre-load controller 308 is therefore responsible for selectively enabling and disabling each of the ways of the cache 104. Details regarding the configuration and functionality of an illustrative embodiment of the pre-load controller 308 are provided below in connection with FIGS. 5 and 8.

As discussed below in more detail, although the disabled way(s) of the cache 104 cannot be accessed by the core processor 102, data can still be transferred between the disabled way(s) of the cache 104 and the main memory 108 either by way of the load buffer 212 (for data transfers from the main memory 108 to the cache 104), or by way of the copy-back buffer 214 (for data transfers from the cache 104 to the main memory 108). In one embodiment, a DMA controller 306 (discussed in more detail below in connection with FIGS. 4 and 7) is employed to effect such data transfers between the main memory 108 and the disabled way(s) of the cache 104 via the buffers 212 and 214.

As shown in FIG. 3, the DMA controller 306 may have one output comprising an internal address (IADDR) bus 330 and another, separate output comprising an external address (EADDR) bus 332. Advantages of using distinct address busses to address the cache memory and the main memory separately are described below.

To effect a data transfer from the main memory 108 to the cache 104, the DMA controller 306 provides on the EADDR bus 332 a first address in the main memory 108 from which data is to be transferred, and provides on the IADDR bus 330 a second address in the cache 104 to which the data from the main memory (received on MLDATA bus 118b) is to be loaded. In this situation, the multiplexer 320 may be controlled so that the address on the EADDR bus 332 is provided on the MLADDR bus 118a, and the multiplexer 312 may be controlled so that the address on the IADDR bus 330 is input to the load buffer 212. As discussed below, the multiplexers 312 and 320 may, for example, be controlled in this manner by the pre-load controller 308 in response to a request by the DMA controller 306 to effect a DMA data transfer from the main memory 108 to the cache 104. In the FIG. 3 embodiment, the multiplexers 312 and 320 are controlled via control lines 340 and 342, respectively, from the pre-load controller 308.

To effect a data transfer from the cache 104 to the main memory 108, the DMA controller 306 provides on the IADDR bus 330 a first address in the cache from which the data is to be read, and provides on the EADDR bus 332 a second address in the main memory 108 to which the data read from the cache 104 is to be written. In this situation, the multiplexer 310 may be controlled so that the address on the EADDR bus 332 is input to the copy-back buffer 214, and the multiplexer 312 may be controlled so that the address on the IADDR bus 330 is input to the load buffer 212. As with the control of the multiplexers 312 and 320 in connection with a DMA transfer from the main memory 108 to the cache 104, the multiplexers 310 and 312 may, for example, be controlled by the pre-load controller 308 in response to a request by the DMA controller 306 to effect a DMA data transfer from the cache 104 to the main memory 108. In the embodiment of FIG. 3, the multiplexers 310 and 312 are controlled via control lines 316 and 340, respectively, from the pre-load controller 308.

Because of the presence of the multiplexers 302 and 304a–d and the multiple decoders 206a–d, accesses by the core processor 102 and the DMA controller 306 to different ways of the cache 104 may be made concurrently. In the embodiment shown, the cache controller 208 and the DMA controller 306 may each be independently responsible for certain control functions that are performed within the cache 104 to enable respective devices to access the tag and data arrays 202 and 204. Such control functions may include, for example, the control of multiplexers 302, 220, 222, 224, 226, 230, and 238, the control of reading and writing operations to the tag array 202 and the data array 204, and the control of latches constituting the various buffers within the cache 104 (e.g., store buffer 210, load buffer 212, copy-back buffer 214, and write buffer 216). The connections between the cache controller 208 and the other elements in the cache 104 that are used to effect these control functions are represented in FIG. 3 by lines 236a–d. Similarly, the connections between the DMA controller 306 and the other elements in the cache 104 that are used to effect these control functions are represented in FIG. 3 by lines 344a–d.

As explained in more detail below, the determination as to whether and when each of the controllers 208 and 306 can utilize and/or permit access to certain cache resources which are shared between these controllers may be determined based upon an arbitration and resource allocation scheme implemented by the pre-load controller 308. As used herein, one controller is capable of controlling access to memory locations of a cache "independently" of another controller when it can control the writing and/or reading of data to and/or from the cache without intervention by the other controller. Under this definition, the fact that two controllers arbitrate for cache resources does not make the controllers operate non-independently, so long as each does not require intervention by the other after one of them wins an arbitration.

To enable data to be read from the data array 204 by the core processor 102 (onto CRDATA bus 112b) at the same time data is being transferred (by the DMA controller 306)

from the data array 204 to the main memory 108, multiplexers 226a and 226b are provided at the output of the data array 204. In the embodiment shown, multiplexer 226a supplies the MSDATA bus 120b (via the copy-back buffer 214 and the multiplexer 230b) to the main memory 108, and multiplexer 226b supplies the CRDATA bus 112b to the core processor 102. Thus, the use of two separate multiplexers 226a–b at the output of the data array 204, in conjunction with the multiple decoders 206a–d and the multiplexers 302 and 304a–d, enables data to be addressed and read from the cache 104 concurrently by the core processor 102 and the DMA controller 306.

Because, in the embodiment shown, accesses by the DMA controller 306 are provided by way of the load buffer 212 and the copy-back buffer 214 (collectively "the cache-miss hardware"), when a cache-miss occurs in response to an access request by the core processor 102, an arbitration must take place for use of these resources. As discussed below, this arbitration may be performed by the pre-load controller 308, which controls the multiplexers 310, 312 and 320 based on the results of the arbitration.

When the core processor 102 and the DMA controller 306 both require use of either the load buffer 212 or the copy-back buffer 214, and the core processor 102 wins the arbitration, the pre-load controller 308 may cause the multiplexer 312 to select the address on the CRADDR bus 112a as its output (via the multiplexer 238), and either cause the multiplexer 310 to select the output of the multiplexer 224 as its output (for a copy-back operation), or cause the multiplexer 320 to select the address output of the load buffer 212 as its output (for a line-fill operation).

On the other hand, when the core processor 102 and the DMA controller 306 both require use of either the load buffer 212 or the copy-back buffer 214, and the DMA controller 306 wins the arbitration, the pre-load controller 308 may cause the multiplexer 312 to select the address on the IADDR bus 330 as its output, and cause either the multiplexer 310 (for a DMA unload operation) or the multiplexer 320 (for a DMA pre-load operation) to select the address on the EADDR bus 332 as its output. In one embodiment, which is described in more detail below, the pre-load controller 308 is configured such that the core processor 102 always wins arbitrations for the shared cache-miss hardware. Alternatively, the pre-load controller 308 may be configured such that the DMA controller 306 always wins arbitrations for the cache-miss hardware, or such that arbitrations for the cache-miss hardware are decided on a first-come-first-served basis or any other suitable basis.

With regard to the configuration of the control busses entering and exiting the cache 104 of FIG. 3, it should be appreciated the multiple control busses illustrated in FIG. 3 for interfacing the cache 104 with each of the core processor 102 and the interface unit 106 may be implemented using either separate or shared busses. That is, even though the control bus 110 interfacing the core processor 102 with the cache 104 is shown in FIG. 3 as constituting three separate CCONT busses 110a, 110b, and 110c, these three busses may alternatively comprise only a single control bus 110 (such as shown in FIG. 1) that is shared by all three of the cache controller 208, the DMA controller 306, and the pre-load controller 308. Similarly, even though the control bus 110 interfacing the cache 104 with the interface unit 106 is shown in FIG. 3 as constituting two separate MCONT busses 116a and 116b, these two busses may alternatively comprise only a single control bus 116 that is shared by both the cache controller 208 and the DMA controller 306.

Figure 4:
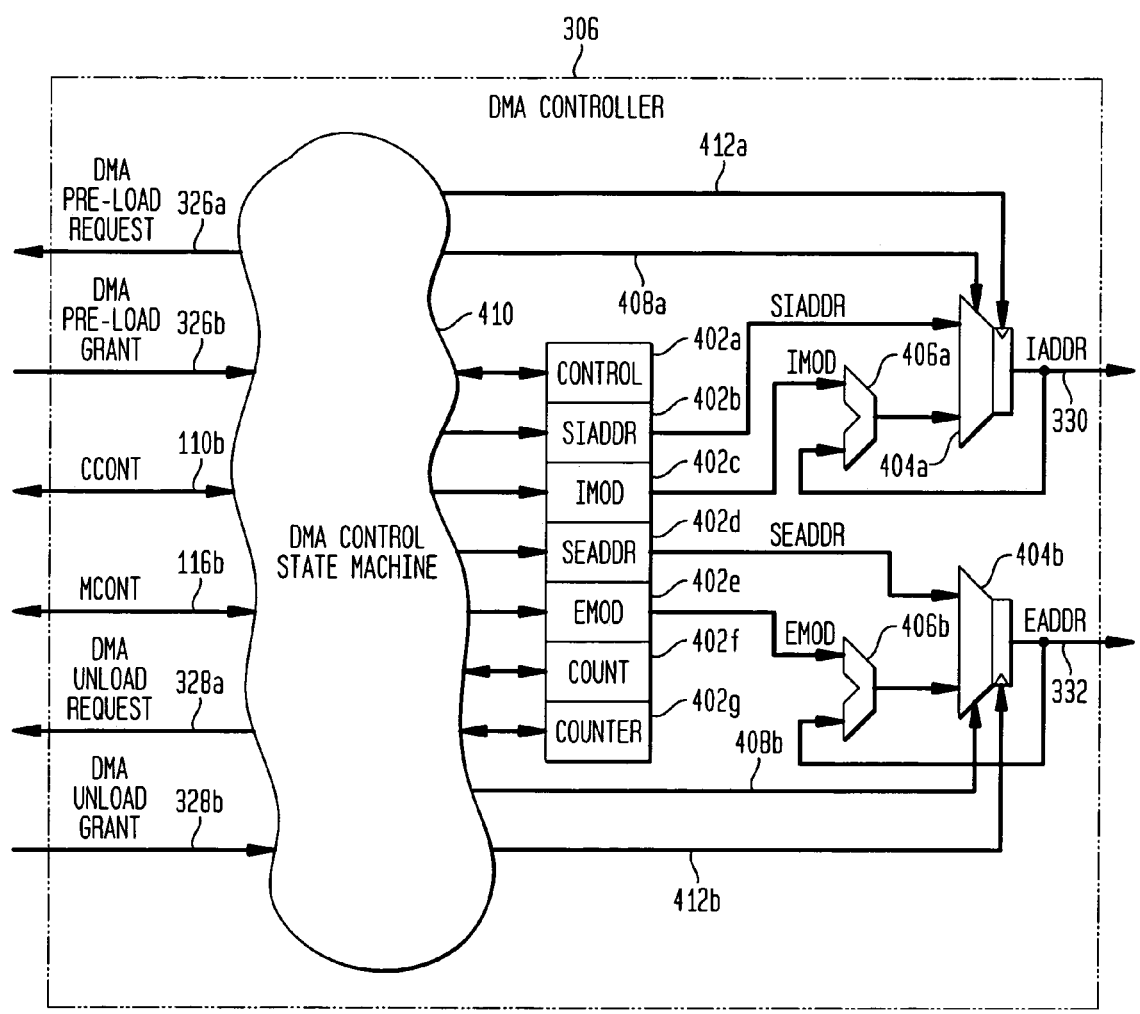
FIG. 4 shows an illustrative embodiment of the DMA controller shown in FIG. 3.

FIG. 4 shows an example of an embodiment of the DMA controller 306 of FIG. 3. As shown, the DMA controller 306 may include seven registers 402a–g, a pair of adders 406a–b, and a pair of clocked multiplexers 404a–b. In addition, as shown, the DMA controller 306 may include a DMA control state machine 410. The DMA control state machine 410 may comprise hardware, firmware, software or any combination thereof, and the invention is not limited to any particular implementation of the state machine 410. In one illustrative embodiment, the DMA control state machine 410 comprises a hardware controller that receives several inputs, executes a limited number of locally-stored instructions responsive to the inputs, and provides several outputs.

As explained in more detail below, the illustrative embodiment of the DMA control state machine 410 shown in FIG. 4 may receive control inputs (via the CCONT bus 110b) from the core processor 102 that instruct the DMA controller 306 to effect a DMA transfer operation with respect to the cache 104. These control inputs may, for example, instruct the DMA control state machine 410 to write certain information and instructions into registers 402a–g, and, depending on the instructions so written, to begin pre-loading information into or unloading information from the tag and data arrays 202 and 204. Upon completion of the DMA transfer operation by the DMA controller 306, the DMA control state machine 410 may so indicate to the core processor 102 by placing an appropriate control signal on the CCONT bus 110b. In the example shown, the DMA control state machine 410 may instruct the interface unit 106 to assist in effecting the DMA transfer operation between the cache 104 and the main memory 108 by placing appropriate control signals on the MCONT bus 116b.

In the embodiment of the DMA controller 306 shown in FIG. 4, the registers 402a–g include a control register 402a, a starting internal address (SIADDR) register 402b, an internal address modulus (IMOD) register 402c, a starting external address (SEADDR) register 402d, an external address modulus (EMOD) register 402e, a count register 402f, and a counter register 402g.

The information written to the control register 402a may include, for example, information instructing the DMA controller 306 to perform a pre-load as opposed to an unload operation, or vice versa (i.e., a "DMA direction" bit), information indicating that the DMA controller should begin a DMA transfer operation (i.e., a "DMA enable" bit), and/or information indicating that the core processor 102 wishes to be interrupted to be told when the DMA transfer operation has completed.

The information written to the SIADDR register 402b may, for example, identify the starting address to be placed on the IADDR bus 330 when the DMA transfer operation begins. The information written to the IMOD register 402c may, for example, identify the number of address units the address presented on the IADDR bus 330 is to be incremented by the DMA controller 306 during the DMA transfer operation. The information written to the SEADDR register 402d may, for example, identify the starting address to be placed on the EADDR bus 332 when the DMA transfer operation begins. The information written to the EMOD register 402e may, for example, identify the number of address units the address presented on the EADDR bus 332 is to be incremented by the DMA controller 306 during the DMA transfer operation. Finally, the information written to the count register 402f may, for example, identify the total number of times that the counter register 402g is to be incremented in response to the addresses placed on the IADDR bus 330 and EADDR bus 332 being incremented by the amounts IMOD and EMOD, respectively.

It should be appreciated that the examples of information that may be stored in the registers 402 to identify the requisite information for performing a DMA transfer operation may take on any of a number of alternative forms, and that the invention is not limited to the use of the particular registers or to the storage of the particular information shown. For example, the function of the counter register 402g may alternatively be implemented using the index field of the address provided on the EADDR bus 332. Also, the values stored in the IMOD register 402c and/or the EMOD register 402e may instead be included in information stored in the control register 402a. For example, the control register 402a may contain a "cache stride" value of "−1," "+1" or "+2," which indicates the number of lines by which the address on the IADDR bus 330 should be incremented during the DMA transfer operation, and/or may contain a "memory stride" value of "0" or "1," which indicates the number of line-sized blocks of addresses by which the address on the EADDR bus 332 should be incremented during the DMA transfer operation.

Cache controllers heretofore have been capable of addressing only contiguous, incrementing areas of memory. That is, a cache line is filled from a starting memory address, which is incremented (only) to fill the rest of the line. We have recognized that this limitation in cache controller design has precluded such controllers from caching a peripheral data port (often implemented as a FIFO). For example, a serial port is often the source of data samples which are collected to form a data buffer somewhere in memory. Once that data buffer is completely constructed, the core processor (e.g., a DSP) is notified that the data is available for processing.

Conventional systems generally would use a DMA controller, external to the cache system, to move the samples from the serial port to a data buffer associated with the cache. After the data was so moved, the DSP would be interrupted, and would start attempting to access the data buffer. Because the samples in the data buffer would not have yet been transferred into the cache, these access attempts by the DSP would generate misses in the cache, such that the cache controller would then pull the data buffer in, line by line, to allow further processing by the DSP. A DMA controller was generally the entity chosen to move data from a serial port to a data buffer because conventional DMA controllers typically had sufficient flexibility in terms of their addressing capabilities that would permit them to do so. That is, conventional DMA controllers are generally capable of not only incrementing addresses, but are also capable of decrementing addresses, of incrementing/decrementing addresses by multiple words (often referred to as "non-unity stride"), or even of addressing the same memory location multiple times, without modifying the address (i.e., "zero stride"). It is the latter capability which permitted a conventional DMA controller to move data from a serial port to a data buffer in the manner described above.

In the embodiment of the invention shown in FIG. 3, the flexible addressing capability of the "integrated" DMA controller 306 which is afforded by the use of IMOD and/or EMOD registers 402c and 402e, and/or by the inclusion of "cache stride" and/or "memory stride" values in the control register 402A, permit the DMA controller 306 to move samples directly from a serial port to the internal memory of the cache, rather than first transferring the samples to a data buffer external to the cache, and later moving the samples from the data buffer to the cache in response to cache misses.

Once the direct transfer of data from the serial port to the internal memory of the cache 104 is complete, the DMA controller 306 may interrupt the DSP, just like in the situation described above involving an un-integrated DMA controller. However, with the integrated DMA controller 306 of FIG. 3, the DSP memory may access hit in the data cache 100% of the time.

Thus, a memory stride of "0" may, for example, be used when the main memory 108 from or to which the DMA transfer is to take place is a first-in-first-out (FIFO) buffer or similar type of peripheral data buffer. In this manner, a peripheral's data FIFO contents may be directly transferred to the cache 104 without requiring a transfer to some other memory region first, and then caching that other memory region. Thus, this configuration may lower cache fill latency, and improve the efficiency of the bus(es) used to fill the cache 104. The above-described ability to stride through the cache 104 and the main memory 108 at different rates (using either different values in the IMOD register 402c and the EMOD register 402e, or different "cache stride" and "memory stride" values in the control register 402a or elsewhere) therefore provides significant advantages and adds a significant degree of functionality to the cache 104 described herein.

In the embodiment of FIG. 4, a first address is provided on the IADDR bus 330 via a first clocked multiplexer 404a, and a second address is provided on the EADDR bus 332 via a second clocked multiplexer 404b. After the proper addresses are present on the IADDR bus 330 and the EADDR bus 332, a data transfer may be initiated (in either direction) between the cache 104 and the main memory 108 by placing an appropriate control signal on the MCONT bus 116b. That is, to effect a data transfer from the main memory 108 to the cache 104, the DMA control state machine 410 may place a control signal on the MCONT bus 116b that instructs the interface unit 106 to transfer the proper number of memory words (typically an entire line) from the main memory 108 (beginning at the address currently on the EADDR bus 332) to the line buffer 212, so that the transferred memory words may be written the location in the cache 104 identified by the address currently on the IADDR bus 332. Similarly, to effect a data transfer from the cache 104 to the main memory 108, the DMA control state machine 410 may place an appropriate control signal on the MCONT bus 116b that instructs the interface unit 106 to transfer the contents of the copy-back buffer 214 to the location in the main memory 108 identified by the address provided to the copy-back buffer 214 via the EADDR bus 332. The data present in the copy-back buffer 214 in this situation may, for example, have been provided from the data array 204 in response the application of the address output of the line buffer 212 to one of the decoders 206a–d, with the address stored in the line buffer 212 having been provided by the IADDR bus 330 (via the multiplexer 312).

One input of the first clocked multiplexer 404a is provided from the SIADDR register 402b, and the other input of the first clocked multiplexer 404a is provided from the output of a first adder 406a. Similarly, one input of the second clocked multiplexer 404b is provided from the SEADDR register 402d, and the other input of the second clocked multiplexer 404a is provided from the output of a second adder 406b. First inputs of the first and second adders 406a and 406b are provided, respectively, from the TMOD register 402c and the EMOD register 402e. Outputs of the first and second clocked multiplexers 404a–b are fed back to second inputs of the first and second adders 406a–b, respectively.

To cycle through the proper ranges of addresses on the IADDR bus 330 and the EADDR bus 332, the DMA control state machine 410 may initially place control signals on control lines 408a and 408b that cause the first and second clocked multiplexers 404a and 404b to select as their outputs the contents of the SIADDR register 402b and the SEADDR register 402d. Then, the DMA control state machine 410 may clock (using control lines 412a and 412b) the first and second clocked multiplexers 404a–b. Thus, the addresses from the SIADDR register 402b and the SEADDR register 402d are initially provided on the IADDR bus 330 and the EADDR bus 332, respectively. The DMA control state machine 410 may then instruct the interface unit 106 to perform a first data transfer of the DMA transfer operation, based upon the starting address on the EADDR bus 332. Subsequently, the DMA control state machine 410 may place control signals on the control lines 408a and 408b that cause the first and second clocked multiplexers 404a and 404b to select as their outputs the outputs of the adders 406a and 406b. Thereafter, each time the clocked multiplexers 406a–b are clocked (via the control lines 412a–b), the addresses provided on the IADDR bus 330 and the EADDR bus 332 are incremented, respectively, by the values stored in the IMOD register 402c and the EMOD register 402e. Each time the addresses on the IADDR bus 330 and the EADDR bus 332 are incremented, the DMA control state machine 410 may again instruct the interface unit to transfer another unit of data in response to the new address on the EADDR bus 332.

Each time the addresses on the IADDR bus 330 and the EADDR bus 332 are incremented, the DMA control state machine 410 may increment the counter register 402g. To determine when a DMA transfer operation has completed, the DMA control state machine 410 may continuously compare the value of the counter register 402g to the value of the count register 402f to identify when the values stored in the two registers are equal. When the values of the counter register 402g is identical to the value of the count register 402f, the DMA control state machine 410 may cease the DMA transfer operation, and may, if appropriate (e.g., if the information stored in the control register 402a indicates an "interrupt enable" condition), communicate to the core processor 102 that the DMA transfer operation has completed.

As discussed above, in the illustrative embodiment of the cache 104 shown in FIG. 3, because the cache-miss hardware is shared between the cache controller 208 and the DMA controller 306, some arbitration must take place for the use of this hardware whenever both controllers require its use simultaneously. In the example shown, this arbitration is performed by the pre-load controller 308. To permit the pre-load controller 308 to perform this arbitration function, prior to performing any transfer of data in connection with a DMA transfer operation, the DMA control state machine 410 may communicate an appropriate request signal to the pre-load controller 308 via one of a DMA pre-load request bus 326a and a DMA unload request bus 328a. In one embodiment, only when an appropriate signal is returned and remains present on a corresponding one of a DMA pre-load grant bus 326b and a DMA unload grant bus 328b does the DMA control state machine 410 initiate or continue a DMA transfer operation. The details of how this arbitration may take place is discussed below in connection with FIGS. 5 and 8A–B.

Figure 5:
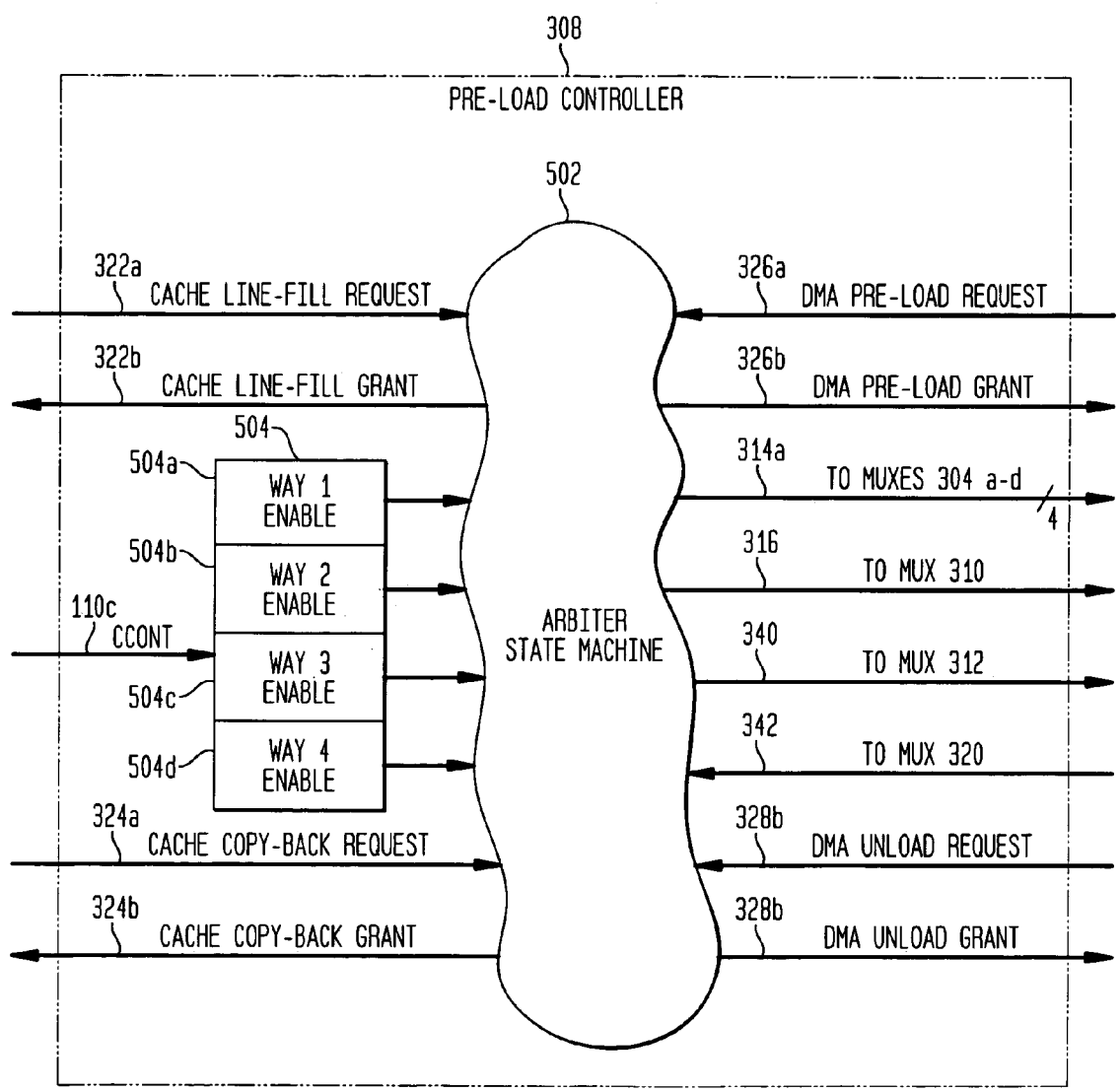
FIG. 5 shows an illustrative embodiment of the Pre-load controller shown in FIG. 3.

FIG. 5 shows an illustrative embodiment of the pre-load controller 308 of FIG. 3. As shown, the pre-load controller 308 may include a "way enable" register 504, and an arbiter state machine 502 which performs the above-discussed arbitration between the cache controller 208 and the DMA controller 306 for the use of the cache-miss hardware (i.e., the load buffer 212 and the copy-back buffer 214). Each bit of the way enable register 504 is associated with one of the four ways of the cache, and the contents of the register 504 are provided to the arbiter state machine 502 to enable the arbiter state machine 502 to properly allocate the cache-miss hardware depending on the enabled or disabled status of each way of the cache 104. In the embodiment shown, the core processor 102 is coupled to the pre-load controller 308 via the CCONT bus 110c so that the core processor 102 can alter each bit of the way enable register 504 (i.e., each one of the bits 504a–d) independently. In this manner, as discussed below, the core processor 102 can selectively disable one of the ways of the cache 104 for pre-loading or unloading by the DMA controller 306 prior to requesting that the DMA controller 306 perform that function.

As mentioned above, the arbiter state machine 502 of the pre-load controller 308 may receive requests from the DMA controller 306 on the DMA pre-load request bus 326a and the DMA unload request bus 328a to allocate the cache-miss hardware to DMA pre-load operations and DMA unload operations, respectively. In addition, as shown in FIG. 5, the arbiter state machine 502 may also receive requests from the cache controller 208 via a cache line-fill request bus 322a and a cache copy-back request bus 324a to allocate the cache-miss hardware to standard line-fill and copy-back operations for the cache 104. The arbiter state machine 502 may, in turn, provide responses to the cache controller 206 on cache line-fill grant bus 322b and cache copy-back grant bus 324b indicating whether the cache controller 208 has been granted use of the requested cache-miss hardware for a line-fill or copy-back operation.

As discussed below in more detail, in response to the various incoming requests for use of the cache-miss hardware, the arbiter state machine 502, based on some predetermined criteria, may place a grant indication on a selected one of the DMA pre-load grant bus 326b, the DMA unload grant bus 328b, the cache line-fill grant bus 322b, and the cache copy-back grant bus 324b, indicating that access to the cache-miss hardware for the requested purpose has been granted. In addition, in response to the states of the bits 504a–d in the way enable register 504, the arbiter state machine 502 also places appropriate control signals on the control lines 314a–d, 316, 340, and 342 so as to properly control the multiplexers 304a–d, 310, 312, and 320, respectively, to enable the cache-miss hardware to be used for the requested purpose.

FIG. 6 shows a flow diagram of a routine 600 that may be executed by the core processor 102 to request that a DMA data transfer operation take place between one of the ways of a cache 104 and the main memory 108. With regard to the illustrative routine of FIG. 6, as well as the routines described below in connection with FIGS. 7 and 8A–B, it should be appreciated the precise order of the method steps is not critical, and that the invention is not limited to embodiments that perform method steps precisely in the order shown. Additionally, it should be appreciated that the method steps shown in these figures represent only one of numerous possible routines that can achieve the desired result, and that the invention is not limited to the particular routines shown. Further, it should be understood that some embodiments of the invention can perform fewer than all of the functions performed by the method steps illustrated, and that the invention is not limited to the embodiments and employ all the functions performed by the illustrated routines.

Referring to FIG. 6, the routine 600 begins at a step 602, wherein it is determined whether a DMA transfer operation is desired by the core processor 102. When, at the step 602, it is determined that a DMA transfer operation is desired, the routine 600 proceeds to a step 604, wherein the core processor 102 alters one of the bits 504a–d of the way enable register 502 of the pre-load controller 308 to identify the way of the cache 104 that is to be disabled for the DMA transfer operation. The core processor 102 may, for example, write to the way enable register 502 via the CCONT bus 110c.

After the step 604, the routine 600 proceeds to a step 606, wherein the core processor 102 writes a direction bit to the control register 402a of the DMA controller 308. This direction bit indicates whether the DMA controller 306 should perform a pre-load or unload DMA operation. Writes by the core processor 102 to the registers 402 of the DMA controller 306 may be performed, for example, via the CCONT bus 110b.

After the step 606, the routine 600 proceeds to steps 608 and 610, wherein the core processor 102 writes appropriate values to the SIADDR register 402b (step 608) and the IMOD register 402c (step 610) of the DMA controller 306.

After the step 610, the routine 600 proceeds to steps 612 and 614, wherein the core processor 102 writes appropriate values to the SEADDR register 402d (step 612) and the EMOD register 402e (step 614) of the DMA controller 306.

After the step 614, the routine 600 proceeds to a step 616, wherein the core processor 102 writes a value to the count register 402f indicating the total number of transfers to be completed during the DMA transfer operation.

After the step 616, the routine 600 proceeds to a step 618, wherein the core processor 102 resets the value of the counter register 402g in the DMA controller 306 to zero.

Finally, after the step 618, the routine 600 proceeds to a step 620, wherein the core processor 102 sets the DMA enable bit in the control register 402a of the DMA controller 306 to indicate that the DMA controller 306 should begin execution of the DMA transfer operation.

After the step 620, the routine 600 waits at the step 622 until the core processor 102 receives an indication from the DMA controller 306 (on CCONT bus 110b) that the DMA controller 306 has completed the requested DMA transfer operation.

After the step 622, the routine 600 proceeds to a step 624, wherein the core processor 102 resets the previously-set bit in the register 504 to re-enable the way of the cache that was disabled for the DMA transfer operation.

After the step 624, the routine 600 returns to the step 602, whereat the routine 600 remains idle until another DMA transfer operation is desired by the core processor 102.

Figure 7A:
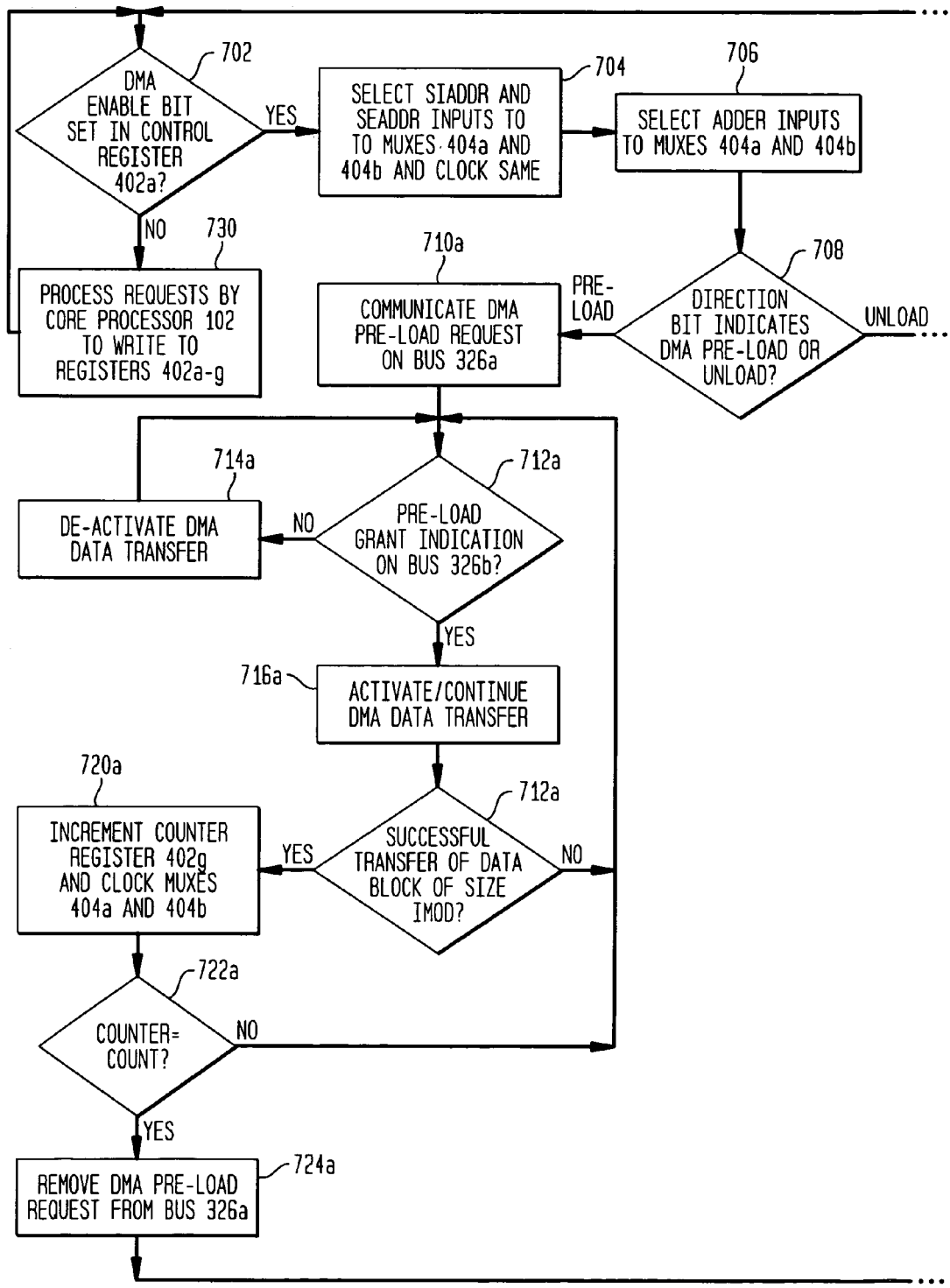
FIG. 7 is a flow chart illustrating an example of a routine that may be executed by the DMA controller of FIG. 4 to practice an embodiment of the invention.
Figure 7B:
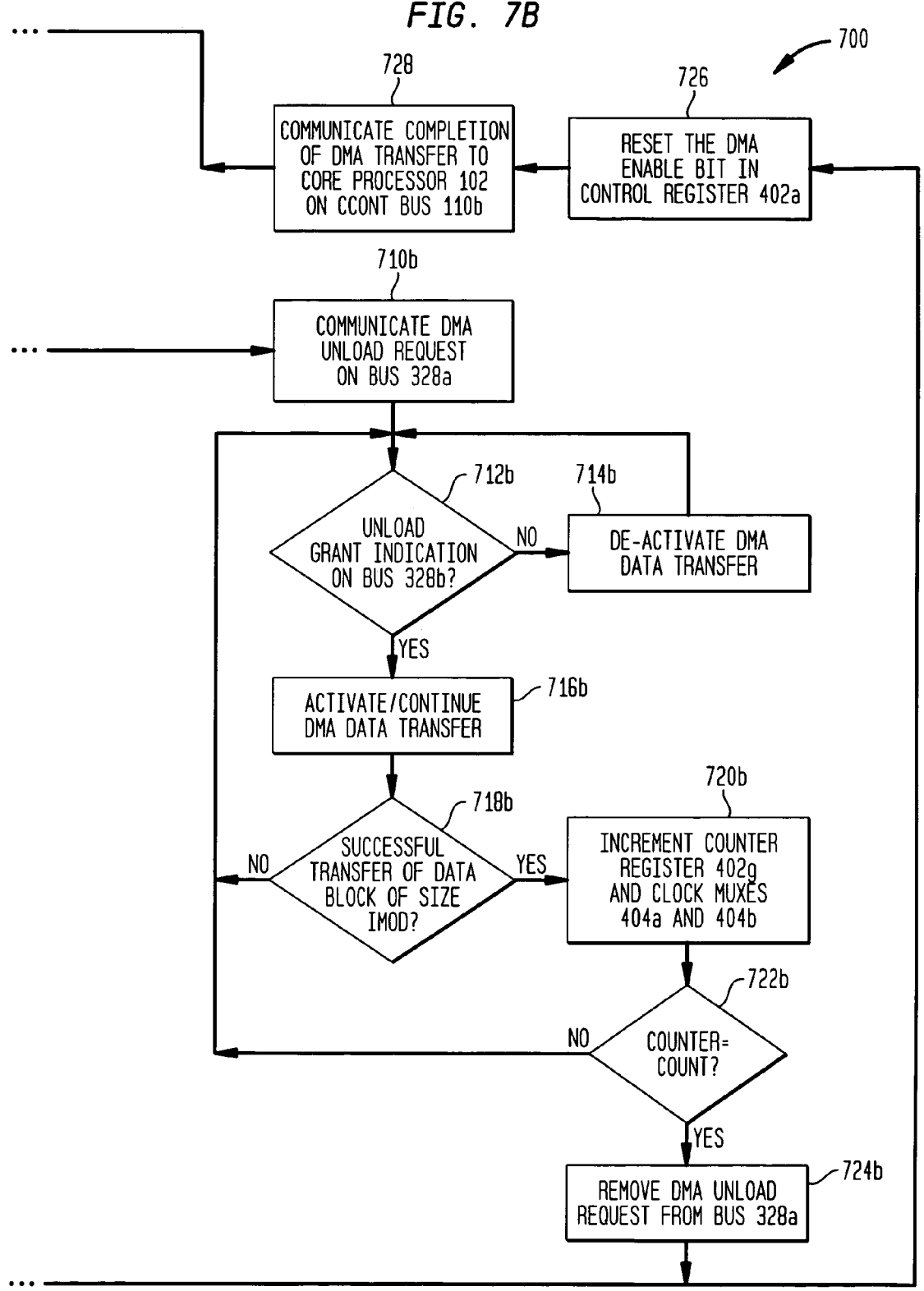

FIG. 7 shows an illustrative embodiment of a routine 700 that may be executed by the DMA control state machine 410 of FIG. 4 in accordance with one embodiment of the invention.

As shown, the routine 700 may begin at a step 702, wherein it is determined whether the core processor 102 has set the DMA enable bit in the control register 402a of the DMA controller 306.

When, at the step 702, it is determined that the DMA enable bit has not yet been set, the routine 700 proceeds to a step 730, wherein requests by the core processor 102 to write to the registers 402a–g of the DMA controller 306 are processed.

After the step 730, and the routine 700 again checks, at the step 702, whether the DMA enable bit has been set.

When, at the step 702, it is determined that the DMA enable bit has been set in the control register 402a, the routine 702 proceeds to a step 704, wherein the multiplexers 404a and 404b are controlled so as to select as their outputs the values from the SIADDR register 402b and the SEADDR register 402d, respectively. This control function may be accomplished, for example, by placing appropriate signals on the control lines 408a and 408b. After the multiplexers 404a and 404b have been controlled appropriately, clock signals may be placed on the control lines 412a and 412b to clock the values of the SIADDR register 402b and the SEADDR register 402d into the multiplexers 404a and 404b, respectively.

After the step 704, the routine 700 proceeds to a step 706, wherein the multiplexers 404a and 404b are controlled (via the control lines 408a and 408b, respectively) to select as their respective outputs the outputs of the adders 406a and 406b.

After the step 706, the routine 700 proceeds to a step 708, wherein, depending on the state of the direction bit in the control register 402a, it is determined whether the routine 700 proceeds to a step 710a or to a step 710b. As shown, when the direction bit indicates the DMA controller 306 is to perform a DMA pre-load operation, the routine 700 proceeds to the step 710a. On the other hand, when the direction bit indicates that the DMA controller 306 is to perform a DMA unload operation, the routine 700 instead proceeds to the step 710b.

At the step 710a, a request is placed on the DMA pre-load request bus 326a to indicate that the DMA controller 306 desires to perform a DMA pre-load operation using the shared cache-miss hardware.

After the step 710a, the routine 700 proceeds to a step 712a, wherein it is determined whether the pre-load controller 308 has returned a grant indication on the DMA pre-load grant bus 326b.

When, at the step 712a, it is determined that no grant indication has yet been received on the bus 326b, the routine 700 proceeds to a step 714a, wherein, if a DMA transfer operation was previously activated, such DMA transfer operation is temporarily deactivated until a grant indication is again received on the bus 326b.

When, at the step 712a, it is determined that a grant indication is present on the DMA pre-load grant bus 326b, the routine 700 proceeds to a step 716a, wherein the DMA controller 306 begins or continues to perform an appropriate DMA transfer operation (e.g., by placing an appropriate control signal on the MCONT bus 116b).

After initiating or re-initiating the DMA transfer operation at the step 716a, the routine 700 proceeds to a step 718a, wherein it is determined whether a data block of the size IMOD (typically the size of a cache line) has successfully been pre-loaded into the cache 104 from the main memory 108.

When, at the step 718a, it is determined that a data block of the appropriate size has not yet been transferred, the routine 700 returns to the step 712a, wherein it is again checked whether a grant indication is present on the DMA pre-load grant bus 326b.

When, at the step 718a, it is determined that an appropriate sized block of data has successfully been pre-loaded into the cache 104 from the main memory, the routine 700 proceeds to a step 720a, wherein the counter register 402g is incremented by one, and an appropriate signal is placed on the control lines 412a and 412b to clock new addresses onto the IADDR bus 330 and the EADDR bus 332. These new addresses should now equal the previous addresses output on the buses 330 and 332 with the values stored in the IMOD register 402c and the EMOD register 402e added to them.

After the step 720a, the routine 700 proceeds to a step 722a, wherein it is determined whether the current value of the counter register 402g is equal to the value of the count register 402f.

When, at the step 722a, it is determined that the value of the counter register 402g is not equal to the value of the count register 402f, the routine 700 returns to the step 712a, wherein it is again checked whether a grant indication is present on the DMA pre-load grant bus 326b. In this regard, it should be appreciated that, if, at any time during a DMA transfer operation, the grant indication is removed from the DMA pre-load grant bus 326b, the DMA controller 306 temporarily ceases the DMA transfer operation until an appropriate indication is again provided on the bus 326b.

When, at the step 722a, it is determined that the current value of the counter register 402g is equal to the value of the count register 402f, the routine 700 proceeds to a step 724a, wherein the DMA control state machine 410 removes the request from the DMA pre-load request bus 326a.

After the step 724a, the routine 700 proceeds to a step 726, wherein the DMA control state machine 410 resets the DMA enable bit in the control register 402a to indicate that the DMA transfer operation has completed.

As mentioned above, when, at the step 708, it is determined that the direction bit in the control register 402a indicates that the DMA controller 306 is to perform a DMA unload operation, the routine 700 proceeds to the step 710b, rather than the step 710a.

At the step 710b, a request is placed on the DMA unload request bus 328a to indicate that the DMA controller 306 desires to perform a DMA unload operation using the shared cache-miss hardware.

After the step 710b, the routine 700 proceeds to a step 712b, wherein it is determined whether the pre-load controller 308 has returned a grant indication on the DMA unload grant bus 328b.

When, at the step 712b, it is determined that no grant indication has yet been received on the bus 328b, the routine 700 proceeds to a step 714b, wherein, if a DMA transfer operation was previously activated, such DMA transfer operation is temporarily deactivated until a grant indication is again received on the bus 328b.

When, at the step 712b, it is determined that a grant indication is present on the DMA unload grant bus 328b, the routine 700 proceeds to a step 716b, wherein the DMA controller 306 begins or continues to perform an appropriate DMA transfer operation (e.g., by placing an appropriate control signal on the MCONT bus 116b).

After initiating or re-initiating the DMA transfer operation at the step 716b, the routine 700 proceeds to a step 718b, wherein it is determined whether a data block of the size IMOD (typically the size of a cache line) has successfully been unloaded from the cache 104 to the main memory 108.

When, at the step 718b, it is determined that a data block of the appropriate size has not yet been transferred, the routine 700 returns to the step 712b, wherein it is again checked whether a grant indication is present on the DMA unload grant bus 328b.

When, at the step 718b, it is determined that an appropriate sized block of data has successfully been unloaded from the cache 104 to the main memory 108, the routine 700 proceeds to a step 720b, wherein the counter register 402g is incremented by one, and an appropriate signal is placed on the control lines 412a and 412b to clock new addresses onto the IADDR bus 330 and the EADDR bus 332. These new addresses should now equal the previous addresses output on the buses 330 and 332 with the values stored in the IMOD register 402c and the EMOD register 402e added to them.

After the step 720b, the routine 700 proceeds to a step 722b, wherein it is determined whether the current value of the counter register 402g is equal to the value of the count register 402f.

When, at the step 722b, it is determined that the value of the counter register 402g is not equal to the value of the count register 402f, the routine 700 returns to the step 712b, wherein it is again checked whether a grant indication is present is removed from the DMA unload grant bus 328b. In this regard, it should be appreciated that, if, at any time during a DMA transfer operation, the grant indication on the DMA unload grant bus 328b, the DMA controller 306 temporarily ceases the DMA transfer operation until an appropriate indication is again provided on the bus 328b.

When, at the step 722b, it is determined that the current value of the counter register 402g is equal to the value of the count register 402f, the routine 700 proceeds to a step 724b, wherein the DMA control state machine 410 removes the request from the DMA unload request bus 328a.

After the step 724a, the routine 700 proceeds to the step 726 (described above).

After the step 726, the routine 700 proceeds to a step 728, wherein the DMA control state machine 410 communicates completion of the DMA transfer operation to the core processor 102. This communication can take place, for example, via the CCONT bus 110b.

Finally, after the step 728, the routine 700 returns to the step 702, wherein the DMA state machine 410 again awaits for the DMA enable bit in the control register 402a to be set by the core processor 102 (after the core processor 102 has written appropriate values to the other registers 402).

FIGS. 8A–B illustrate an illustrative embodiment of a routine 800 that may be executed by the arbiter state machine 502 of FIG. 5. As shown in FIG. 8A, the routine 800 may begin at a step 802, wherein the arbiter state machine 502 determines whether it has received a request on the DMA pre-load request bus 326a.

When, at the step 802, it is determined that a request has been received on the DMA pre-load request bus 326a, the routine 800 proceeds to a step 808, wherein the one of the multiplexers 304a–d that is associated with the disabled way of the cache 104 (as determined by the way enable bits 504a–d) is controlled to select as its output the address output of the line-fill buffer 212.

After the step 808, the routine 800 proceeds to a step 810, wherein the multiplexer 312 is controlled to select as its output the address on the IADDR bus 330.

After the step 810, the routine 800 proceeds to a step 812, wherein the multiplexer 320 is controlled to select as its output the address on the EADDR bus 332.

After the step 812, the routine 800 proceeds to a step 814, wherein the arbiter state machine 502 places a grant indication on the DMA pre-load grant bus 326b.

After the step 814, the routine 800 proceeds to a step 816, wherein it is determined whether there remains an active request on the DMA pre-load request bus 326a.

When, at the step 816, it is determined that an active request remains on the DMA pre-load request bus 326a, the routine 800 proceeds to the routine 806 (described below).

After completing the routine 806, the routine 800 returns to the step 816 to again determine whether an active request remains on the bus DMA pre-load request bus 326a.

When, at the step 816, it is determined that an active request is no longer present on the DMA pre-load request bus 326a, the routine 800 proceeds to a step 818, wherein the one of the multiplexers 314a–d associated with the disabled way of the cache 104 is controlled so as to select as its output the output of multiplexer 302.

After the step 818, the routine 800 proceeds to a step 820, wherein the multiplexer 312 is controlled to select as its output the address present on the CRADDR bus 112a.

After the step 820, the routine 800 proceeds to a step 822, wherein the multiplexer 320 is controlled to select as its output the address output of the line buffer 212.

After the step 822, the routine 800 proceeds to a step 824, wherein the grant indication is removed from the DMA pre-load grant bus 326b.

Finally, after the step 824, the routine 800 proceeds to a step 804, wherein it is determined whether a request has been received on the DMA unload request bus 328a.

As shown, the routine 800 may also proceed to the step 804 when, at the step 802, it is determined that no request has been received on the DMA pre-load request bus 326a.

When, at the step 804, it is determined that a request has been received on the DMA unload request bus 328a, the routine 800 proceeds to a step 826, wherein the one of the multiplexers 304a–d that is associated with the disabled way of the cache 104 (as determined by the way enable bits 504a–d) is controlled to select as its output the address output of the line-fill buffer 212.

After the step 826, the routine 800 proceeds to a step 828, wherein the multiplexer 312 is controlled to select as its output the address on the IADDR bus 330.

After the step 828, the routine 800 proceeds to a step 830, wherein the multiplexer 310 is controlled to select as its output the address on the EADDR bus 332.

After the step 830, the routine 800 proceeds to a step 832, wherein the arbiter state machine 502 places a grant indication on the DMA unload grant bus 328b.

After the step 832, the routine 800 proceeds to a step 834, wherein it is determined whether there remains an active request on the DMA unload request bus 328a.

When, at the step 834, it is determined that an active request remains on the DMA unload request bus 328a, the routine 800 proceeds to the routine 806 (described below).

After completing the routine 806, the routine 800 returns to the step 834 to again determine whether an active request remains on the bus DMA unload request bus 328a.

When, at the step 834, it is determined that an active request is no longer present on the DMA unload request bus 328a, the routine 800 proceeds to a step 836, wherein the one of the multiplexers 314a–d associated with the disabled way of the cache 104 is controlled so as to select as its output the output of multiplexer 302.

After the step 836, the routine 800 proceeds to a step 838, wherein the multiplexer 312 is controlled to select as its output the address present on the CRADDR bus 112a.

After the step 838, the routine 800 proceeds to a step 840, wherein the multiplexer 310 is controlled to select as its output the output of the multiplexer 224.

After the step 840, the routine 800 proceeds to a step 842, wherein the grant indication is removed from the DMA unload grant bus 328b.

Finally, after the step 842, the routine 800 proceeds to the routine 806, an illustrative embodiment of which is described below in connection with FIG. 8B.

As shown, the routine 800 may also proceed to the routine 806 when, at the step 804, it is determined that no request has been received on the DMA unload request bus 328a.

Finally, after the completion of the routine 806 (described below), the routine 800 returns to the step 802, wherein it is again determined whether a request has been received on the DMA pre-load request bus 326a.

As shown in FIG. 8B, the routine 806 begins at a step 844, wherein it is determined whether the arbiter state machine 502 has received a request on the line-fill request bus 322a.

When, at the step 844, it is determined that a request is present on the line-fill request bus 322a, the routine 806 proceeds to a step 846, wherein, if a grant indication is present on the DMA pre-load grant bus 326b, that indication is removed immediately.

Similarly, after the step 846, the routine 806 proceeds to a step 848, wherein, if a grant indication is present on the DMA unload grant bus 328b, that indication also is removed immediately.

After the step 848, the routine 806 proceeds to a step 850, wherein the three of the multiplexers 314a–d associated with enabled ways of the cache 104 are controlled so as to select as their outputs the address output of the line-fill buffer 212.

After the step 850, the routine 806 proceeds to a step 852, wherein the multiplexer 312 is controlled so as to select as its output the address present on the CWADDR bus 108a.

After the step 852, the routine 806 proceeds to a step 854, wherein the multiplexer 320 is controlled so as to select as its output the address output of the line-fill buffer 212.

After the step 854, the routine 806 proceeds to a step 856, wherein a grant indication is communicated to the cache controller 208 (via the line-fill grant bus 322b).

After the step 856, the routine 806 proceeds to a step 858, wherein the arbiter state machine 502 determines whether an active request remains on the line-fill request bus 322a. The routine 806 stalls at the step 858 until the line-fill request bus 322a no longer has an active signal thereon.

After the active signal has been removed from the line-fill request bus 322a, the routine 806 proceeds to a step 860, wherein the three of the multiplexers 314a–d associated with the enabled ways of the cache 104 are controlled so as to select as their outputs the output of the multiplexer 302.

After the step 860, the routine 806 proceeds to a step 862, wherein the grant indication is removed from the line-fill grant bus 322b.

Finally, after the step 862, the routine 806 proceeds to a step 864, wherein it is determined whether a request is present on the copy-back request bus 324a.

As shown, the routine 860 may also proceed to the step 864 when, at the step 844, it is determined that no request is present on the line-fill request bus 322.

When, at the step 864, it is determined that a request is present on the copy-back request bus 324a, the routine 806 proceeds to a step 866, wherein, if a grant indication is present on the DMA unload grant bus 328b, that indication is removed immediately.

Similarly, after the step 866, the routine 806 proceeds to a step 868, wherein, if a grant indication is present on the DMA pre-load grant bus 326b, that indication also is removed immediately. In this regard, it should be appreciated that, in the illustrative embodiment of the arbiter state machine 502 described herein, the core processor 102 is given priority in all situations with regard to the access of the shared cache-miss resources. As mentioned above, however, this is not a critical feature of the invention, and other priority schemes may alternatively be employed.

After the step 868, the routine 806 proceeds to a step 870, wherein the three of the multiplexers 314a–d associated with enabled ways of the cache 104 are controlled so as to select as their outputs the address output of the line-fill buffer 212.

After the step 870, the routine 806 proceeds to a step 872, wherein the multiplexer 312 is controlled so as to select as its output the address present on the CWADDR bus 108a.

After the step 872, the routine 806 proceeds to a step 874, wherein the multiplexer 310 is controlled so as to select as its output the output of the multiplexer 224.

After the step 874, the routine 806 proceeds to a step 876, wherein a grant indication is communicated to the cache controller 208 (via the copy-back grant bus 324b).

After the step 876, the routine 806 proceeds to a step 878, wherein the arbiter state machine 502 determines whether an active request remains on the copy-back request bus 324a. The routine 806 stalls at the step 878 until the copy-back request bus 324a no longer has an active signal thereon.

After the active signal has been removed from the copy-back request bus 324a, the routine 806 proceeds to a step 880, wherein the three of the multiplexers 314a–d associated with the enabled ways of the cache 104 are controlled so as to select as their outputs the output of the multiplexer 302.

After the step 880, the routine 806 proceeds to a step 882, wherein the grant indication is removed from the copy-back grant bus 324b.

Finally, after the step 882, the routine 806 terminates. As shown, the routine 806 also terminates when, at the step 864, it is determined that no copy-back request is present on the bus 324a.

Figure 9:
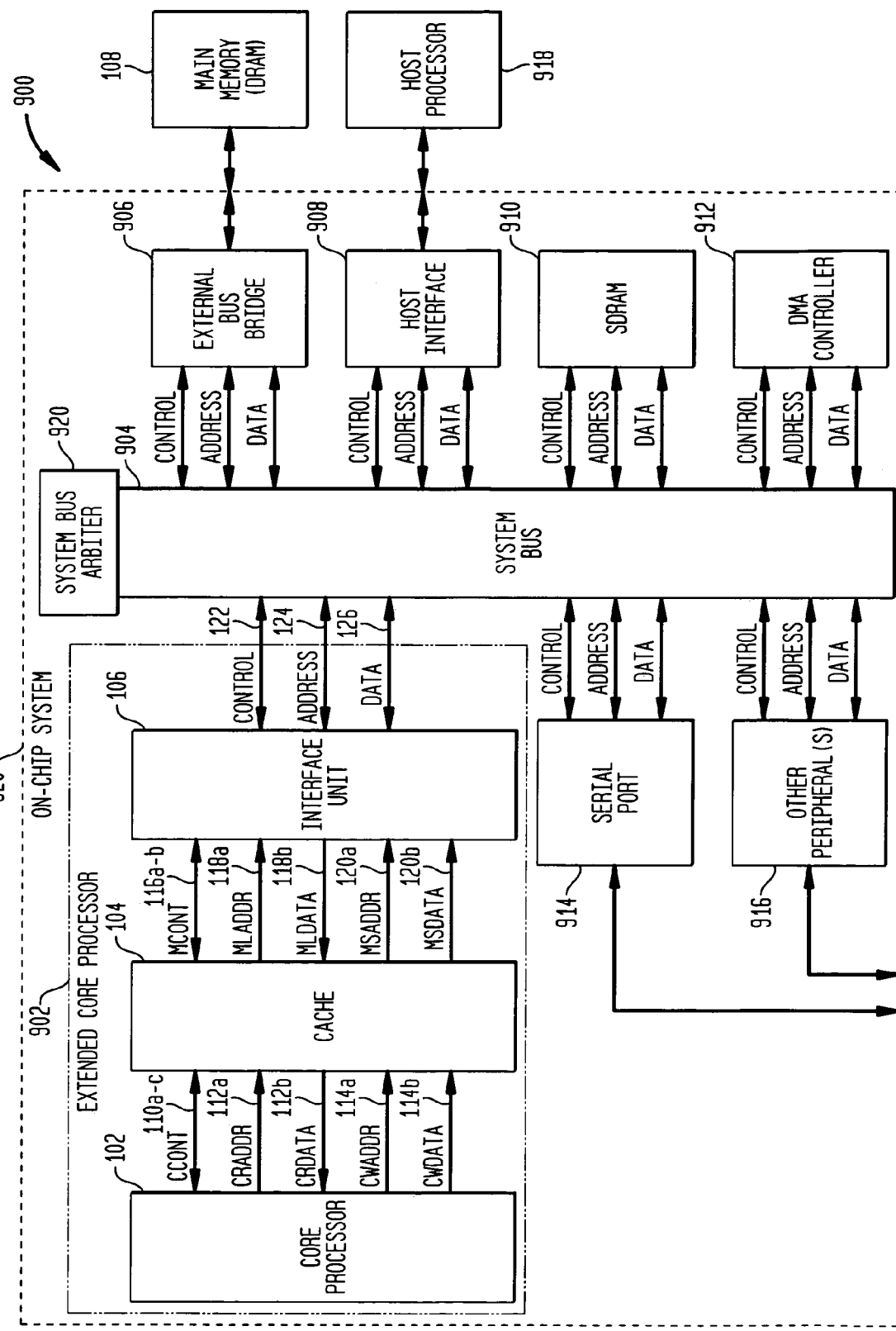
FIG. 9 is a block diagram showing an example of computer system in which the cache of FIG. 3 may be employed in one embodiment of the invention.

FIG. 9 shows an illustrative embodiment of a computer system 900 in which the present invention may be employed. As shown, an extended core processor 902 of the computer system 900 may include the core processor 102, the cache 104, and the interface unit 106 described herein. In the embodiment shown, the extended core processor 902 is coupled to a system bus 904, and the system bus 904, in turn, is coupled to a number of peripheral components and ports. As shown, such components/ports may include, for example, an external bus bridge 906, a host interface 908, an SDRAM 910, a DMA controller 912, a serial port 914, and one or more other peripherals 916. A system bus arbiter 920 may determine which of the peripheral components (including the interface unit 106) is given access to the system bus 904 at a given time.

As shown, the extended core processor 902, the system bus 904, the system bus arbiter 906, and all of the above-referenced peripheral components 906–916, may be disposed on a single integrated circuit (IC) chip 920. It should be appreciated, of course, that this is only one example of a configuration of the system 900, and that other configurations in which some or all of the various components are disposed on one or more separate chips are also possible.

As shown in FIG. 9, the main memory 108 may be coupled to the system bus 904 via the external bus bridge 906. In this regard, it should be appreciated that the core processor 102, the cache 104, the interface unit 106, and the main memory 108 may correspond, for example, to the identically named components described above in connection with FIGS. 1–8. Thus, a DMA controller 306 in the cache 104 or another DMA controller external to the cache 104 may, for example, perform DMA transfer operations between the cache 104 and the main memory 108. Alternatively, a DMA controller within the cache 104 or another DMA controller external to the cache 104 may perform DMA transfer operations between the cache 104 and any other memory component in the computer system 900.

As illustrated, a host processor 918 may be coupled to the system bus 904 via the host interface 908. The host processor 918 may be used, for example, to access and control the various components coupled to the system bus 904. The purpose and effect of this control is well-known in the art, and therefore will not be described in detail herein.

As used herein, "lower-level memory" refers to any memory level that exists, with respect to a referenced memory level, at a lower-level in a memory hierarchy, regardless of what form that memory takes. A lower-level memory with respect to a cache may, for example, include a semiconductor SRAM or DRAM, a virtual memory such as a magnetic or optical disk, or another level of cache.

While the data transfer engine described herein is referred to as a DMA controller, it should be appreciated that various aspects of the present invention may be applied using any of a number of alternative data transfer engines, and that the invention is not limited to the use of a DMA controller for this purpose. For example, a controller that transfers only a single memory word at a time may alternatively be used. In addition, with regard to the various aspects of the invention relating to the permitting of multiple devices to concurrently access respective portions of a cache, it should be appreciate that these devices that so access the cache can take on any of numerous forms, and that the invention is not limited to the use of a core processor and/or a DMA controller as one of these devices.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A cache memory system, comprising:
   an associative cache including a plurality of memory locations to store data and addresses associated with the data;
   a first controller that controls access to the plurality of memory locations by a first device;
   a second controller that operates independently of the first controller and controls access to the plurality of memory locations by a second device;
   an address input for selecting memory locations to be accessed;
   at least one first multiplexer that selects addresses to be provided to the address input from among addresses provided by the first device and addresses provided by the second controller;
   an address output for outputting addresses retrieved from memory locations along with data associated therewith; and
   at least one second multiplexer that selects external addresses to be inputted to the second device from among the addresses outputted at the address output and external addresses provided by the second controller.

2. The system of claim 1, wherein the second controller comprises a data transfer engine that transfers data from a lower-level memory to the memory locations.

3. The system of claim 2, wherein the data transfer engine transfers data from the memory locations to the lower-level memory.

4. The system of claim 3, wherein the data transfer engine comprises a DMA controller.

5. The system of claim 2, wherein the data transfer engine comprises a DMA controller.

6. The system of claim 5, in combination with the first device, wherein the first device comprises a digital signal processor.

7. The system of claim 1, wherein the second controller comprises a DMA controller which provides at least one first address identifying at least one memory location of the second device from which data sets are to be transferred, and at least one second address identifying at least one memory location of the cache to which the data sets are to be transferred.

8. The system of claim 7, wherein the DMA controller is configured such that the second address can be incremented or decremented between consecutively transferred data sets without also incrementing or decrementing the first address between the consecutively transferred data sets.

9. The system of claim 7, wherein the DMA controller is configured such that the second address can be incremented or decremented between consecutively transferred data sets by a different amount than the first address is incremented or decremented between the consecutively transferred data sets.

10. The system of claim 1, wherein the first and second controllers are integrated on a common semiconductor die.

11. The system of claim 1, wherein each of the plurality of memory locations has only a single word line associated therewith.

12. The system of claim 1, further comprising a third controller that controls arbitration for shared cache resources among the first controller and the second controller.

13. The system of claim 1, in combination with the first device, wherein the first device comprises a processor.

14. The combination of claim 13, wherein the processor comprises a digital signal processor.

15. A method, comprising:
    selecting addresses to be provided to an address input of an associative cache from among addresses provided by a first device and addresses provided by a second device;
    accessing memory locations within the associative cache based upon the selected addresses provided to the address input of the cache;
    outputting addresses retrieved from memory locations of the associative cache along with data associated therewith; and
    selecting external addresses to be outputted to the second device from among the addresses output from the associative cache and external addresses inputted by the second device.

16. The method of claim 15, wherein accessing memory locations includes using a data transfer engine to transfer data from a lower-level memory to the memory locations of the associative cache.

17. The method of claim 16, wherein accessing memory locations includes using the data transfer engine to transfer data from the memory locations of the associative cache to the lower-level memory.

18. The method of claim 15, wherein each of the memory locations has only a single word line associated therewith.

19. The method of claim 15, wherein accessing memory locations includes using a DMA controller to transfer data from a lower-level memory to memory locations of the associative cache, the DMA controller providing at least one first address identifying at least one memory location of the lower-level memory from which data sets are to be transferred, and further providing at least one second address identifying at least one of the plurality of memory locations to which the data sets are to be transferred.

20. The method of claim 19, wherein accessing memory locations further includes incrementing or decrementing the second address between consecutively transferred data sets without also incrementing or decrementing the first address between the consecutively transferred data sets.

21. The method of claim 19, wherein accessing memory locations further includes incrementing or decrementing the second address between consecutively transferred data sets by a different amount than the first address is incremented or decremented between the consecutively transferred data sets.

22. A cache memory system, comprising:
    an associative cache including a plurality of memory locations to store data and addresses associated with the data;
    means for selecting addresses to be provided to an address input of an associative cache from among addresses provided by a first device and addresses provided by a second device;
    means for accessing locations within the associative cache based upon the selected addresses provided to the address input of the associative cache;
    means for outputting addresses retrieved from memory locations of the associative cache along with data associated therewith; and
    means for selecting external addresses to be inputted to the second device from among the addresses output from the associative cache and external addresses outputted by a second device.

* * * * *